(12) United States Patent
Nilsson et al.

(10) Patent No.: US 9,908,238 B2
(45) Date of Patent: Mar. 6, 2018

(54) METHOD AND SYSTEM FOR DETERMINATION OF AT LEAST ONE PROPERTY OF A MANIPULATOR

(71) Applicant: COGNIBOTICS AB, Lund (SE)

(72) Inventors: Klas Nilsson, Lund (SE); Adam Nilsson, Lund (SE); Mathias Haage, Lund (SE); Bjorn Olofsson, Lund (SE); Anders Robertsson, Lund (SE); Olof Sornmo, Lund (SE)

(73) Assignee: COGNIBOTICS AB, Lund (SE)

( * ) Notice: Subject to any disclaimer, the term of this patent is extended or adjusted under 35 U.S.C. 154(b) by 71 days.

(21) Appl. No.: 14/913,966

(22) PCT Filed: Aug. 25, 2014

(86) PCT No.: PCT/SE2014/050965
§ 371 (c)(1),
(2) Date: Feb. 23, 2016

(87) PCT Pub. No.: WO2015/030650
PCT Pub. Date: Mar. 5, 2015

(65) Prior Publication Data
US 2016/0221189 A1    Aug. 4, 2016

(30) Foreign Application Priority Data
Aug. 27, 2013 (SE) ...................................... 1350981

(51) Int. Cl.
*B25J 9/16* (2006.01)
(52) U.S. Cl.
CPC ... *B25J 9/1653* (2013.01); *G05B 2219/39183* (2013.01); *G05B 2219/39186* (2013.01); *G05B 2219/40527* (2013.01)

(58) Field of Classification Search
CPC ........... G05B 2219/39048; G05B 2219/39049; G05B 2219/39183; G05B 2219/40527;
(Continued)

(56) References Cited

U.S. PATENT DOCUMENTS 4,967,126 A * 10/1990 Gretz ..................... B25J 9/1612
                                                                318/567
5,347,459 A *  9/1994 Greenspan ............. B25J 9/1666
                                                                345/424
(Continued)

FOREIGN PATENT DOCUMENTS

JP      2004066385 A   *  3/2004
WO      WO99/12082         3/1999
WO      WO2014/065744      5/2014

OTHER PUBLICATIONS

Abele et al.; "Cartesian Compliance Model for Industrial Robots Using Virtual Joints"; German Academic Society for Production Engineering; Prod. Eng. Res. Devel.; 2:339-343; Jul. 22, 2008.
(Continued)

*Primary Examiner* — Ryan Rink
(74) *Attorney, Agent, or Firm* — Klein, O'Neill & Singh, LLP

(57) ABSTRACT

A method and system for determining at least one property associated with a selected axis of a manipulator (2). The elasticity of the links (4, 6, 9, 10, 13, 14) and joints (3, 5, 7, 8, 11, 12) of a manipulator (2) can be modeled and the resulting compliance can be determined. A certain method is used to control the manipulator (2) such that certain quantities related to actuator torque and/or joint position can be determined for a certain kinematic configuration of the manipulator (2). Depending on the complexity of the manipulator (2) and the number of properties that are of interest, the manipulator (2) is controlled to a plurality of different kinematic configurations in which configurations
(Continued)

the quantities are determined. Thereafter, a stiffness matrix (K) for each component of the manipulator (2) can be determined, and a global stiffness matrix (MSM) for the total manipulator (2) can be determined in order to determine at least one property of the selected axis.

22 Claims, 14 Drawing Sheets

(58) Field of Classification Search
CPC .......... G05B 2219/41059; B25J 9/1692; B25J 9/1653; B25J 9/009; B25J 9/1641
See application file for complete search history.

(56) References Cited

U.S. PATENT DOCUMENTS

| | | | | |
|---|---|---|---|---|
| 5,581,166 | A * | 12/1996 | Eismann | B25J 9/04 318/568.18 |
| 6,321,137 | B1 * | 11/2001 | De Smet | B25J 9/1692 700/245 |
| 2005/0278067 | A1 * | 12/2005 | Bader | B25J 9/1641 700/245 |
| 2008/0257096 | A1 * | 10/2008 | Zhu | B25J 7/00 74/490.08 |
| 2011/0046925 | A1 | 2/2011 | Bidard et al. | |
| 2013/0079928 | A1 | 3/2013 | Soe-Knudsen et al. | |
| 2013/0238126 | A1 * | 9/2013 | Ohta | B25J 9/1643 700/254 |
| 2013/0238127 | A1 * | 9/2013 | Ohta | B25J 9/1692 700/254 |
| 2014/0018959 | A1 * | 1/2014 | Matsui | B25J 9/1666 700/255 |
| 2014/0222352 | A1 * | 8/2014 | Sander-Tavallaey | B25J 9/1674 702/35 |
| 2014/0311271 | A1 * | 10/2014 | Cao | B25J 9/0036 74/490.05 |
| 2015/0248121 | A1 * | 9/2015 | Nilsson | B25J 9/1641 318/569 |

OTHER PUBLICATIONS

Moberg, S.; "Modeling and Control of Flexible Manipulators"; Linkoping studies in science and technology, Dissertations, No. 1349; Department of Electrical Engineering, Linkoping University, Sweden; 2010; ISBN 978-91-7393-289-9.

International Search Report on corresponding PCT application (PCT/SE2014/050965) from International Searching Authority (EPO) dated May 8, 2015.

Written Opinion on corresponding PCT application (PCT/SE2014/050965) from International Searching Authority (EPO) dated May 8, 2015.

Bennett et al.; "Kinematic calibration by direct estimation of the Jacobian matrix"; Proceedings of the International Conference on Robotics and Automation; Nice; vol. Conf. 8, pp. 351-357; May 12-14, 1992; XP010027936.

Khalil et al.; "Geometric calibration of robots with flexible joints and links"; Journal of Intelligent and Robotic Systems; Kluwer Dordrecht, Netherlands; vol. 34, No. 4, pp. 357-379; Aug. 1, 2002; XP002473837.

Dwivedy et al.; "Dynamic analysis of flexible manipulators, a literature review"; Mechanism and Machine Theory, Pergamon, Amsterdam, Netherlands; vol. 41, No. 7, pp. 749-777; Jul. 1, 2006; XP027930534.

* cited by examiner

METHOD AND SYSTEM FOR DETERMINATION OF AT LEAST ONE PROPERTY OF A MANIPULATOR

CROSS-REFERENCE TO RELATED APPLICATION

This application is the National Phase, under 35 U.S.C. § 371(c), of International Application No. PCT/SE2014/050965, filed Aug. 25, 2014, the disclosure of which is incorporated herein by reference in its entirety.

FEDERALLY SPONSORED RESEARCH OR DEVELOPMENT

Not Applicable

TECHNICAL FIELD

The present invention is related to a method and a system for determining at least one property such as compliance of a manipulator, and computer products for determination and utilization of the obtained at least one property.

BACKGROUND

Robots have found wide application in many areas of industry. Some industrial areas involve labor dangerous to human health or labor performed under conditions not possible for humans to withstand. Other areas of industry involve repetitive tasks which can be performed much more efficiently and precisely by a robot.

Most industrial robots comprise a manipulator devised to manipulate materials, where the manipulator usually has an arm-like mechanism consisting of a series of segments, each referred to as a link in the following. Movement of the manipulator can either be effected manually by an operator or automatically by performing instructions according to a user program that defines the robot task. In the latter case the manipulator is controlled by the user program loaded or entered into a controller to reach a programmed pose (position and orientation for desired end-effector placement). The controller is the part of the robot that controls the movement of the manipulator by actuation of the link motions via motors, drive-trains and jointed mechanical arrangements forming a mechanism with a certain kinematic structure.

The number of independent parameters that determine a positional state of a rigid body (a stiff link) or of a mechanism is referred to as the Degree Of Freedom (DOF, also used in plural for Degrees Of Freedom). A free rigid body in 3-dimensional (Euclidian) space has 6 DOF (three translational and three rotational). A rigid or stiff link comprises such a rigid body. Each kinematic pair of links is connected via a joint that is usually sliding (the joint may then also be called prismatic, linear, or translational joint) or jointed (the joint may then also be called revolute or rotational joint). One such joint constrains five out of the six possible DOF of one link relative to the other one in the pair of links, which in a non-singular configuration of the manipulator adds one DOF to the final link (ending with a tool-mounting end-flange) of the manipulator. By means of its kinematic structure of links and joints, the DOF of the manipulator (manipulator-DOF) can be considered as being the minimum number of coordinates required to specify a kinematic configuration.

Since a tool, referred to as an end-effector of the robot (or equivalently a tool changer permitting changes of end-effector manually or without manual assistance), is another physical body to be moved in Euclidian space, 6 DOF manipulators are most common since they comprise the minimum for full movability of the end-effector, which for a normal non-singular configuration requires 6 of the above mentioned joints. Other types of joints such as spherical and cylindrical joints also exist, but these can be seen as combinations of the above mentioned more simple joints, and are referred to as joints in the following. Joints can as mentioned be rotational or translational, but both cases are equivalently covered in the following. This corresponds to the established notion of generalized joint coordinates in the robotics literature. The manipulator-DOF joint coordinates define the kinematic configuration, which also defines the end-effector pose but possibly not uniquely.

A joint is typically actuated by a feedback-controlled motor via a drive train including gears for reducing the motor rotations to lower-speed joint rotations. The drive train then basically is a transmission, but we assume an ideal motor and any relevant actuator/motor dynamics is included in the drive train. The drive train is avoided in a so called direct-drive joint, but due to practical and fundamental problems with direct drives almost all robots are built with a drive train for each joint. The following description, however, also covers direct drive joints, being the special case of a known and ideal drive train with gear ratio one. It is here referred to the typical arrangement of a joint and link, including its motor for actuation and any drive train, as being an axis (plural: axes).

The complete kinematic structure of a manipulator often includes internal joint kinematics when joint motions are coupled inside the manipulator, which is very common for wrist motions as is the case for Axis 5 and Axis 6 of the manipulator 2 in FIG. 1. While the internal joint kinematics can be relevant for the practices of the current invention, we can ignore it in the following since the principles of the current invention deals with the motions following the joint torques as if each joint would have been of the direct-drive type. Hence, by kinematics we here refer to the joints and links forming the arm structure of the manipulator.

The mentioned usual arm-like mechanism comprising a manipulator typically means a pure serial kinematic manipulator or mechanism (SKM, in the literature referring to the equivalent notion of a serial-kinematic machine), meaning that each link is followed by a joint and then the next link forming a serial chain from the foot (or mobile base) of the robot to the end-flange. Alternatively, links can also be arranged in parallel, thereby forming a parallel-kinematic manipulator (PKM). A vast number of combinations of SKM and PKM structures can be built.

In robot applications, such as those for industrial robots in manufacturing, it is highly desirable that the resulting physical pose, within certain tolerances, agrees with the programmed pose. To support efficient specification of poses for the end-effector, either manually or in the user program and possibly from CAD data, the controller therefore contains a kinematic model of the manipulator. The kinematic model includes the joints and the links and their geometric relations of the manipulator, assuming those parts comprising rigid bodies. Since manipulators are not quite rigid, there will be deflections due to mass and process forces resulting in a deviation at the location of the end effector. A deviation between the programmed pose and the physical pose, can be at a single location or at a multitude of locations along a path, or any use of the robot. Managing deviations by the user via adjustments in the user program or by teach-in of slightly deviating programmed poses, limits the reuse of robot tasks and increases the cost for robot programming and deployment.

During the first decades of robotics the major deviations were due to deficient control such as inadequate trajectory generation (e.g., not considering joint torque saturations) and too primitive feedforward compensation (e.g., with path errors resulting from joint servo control errors). Knowing detailed manipulator parameters would not have been useful in early systems since there were no control functions utilizing them. The extensive use of model-based control thereafter, utilizing knowledge about the manipulator properties to optimize the control, resulted in great performance improvements and robots that approximately performed as programmed from the mid-1980s and onwards. Still, robots deviate from their programmed motion due to missing control compensation of several specific manipulator properties. A modern controller typically has a suitable structure and functionality for such compensation but lacks the actual robot specific data due to missing practical methods for obtaining and maintaining that data. There is thus a need to deal with these deviations in order to obtain as little deviation as possible from the programmed pose, and thereby a need for a practical method for determining the related manipulator properties.

There are several causes for deviations from the programmed pose. One cause may be inaccuracies in the link and joint geometries, i.e. due to kinematic errors. Kinematic errors can be managed by kinematic calibration, which is usually available from the robot manufacturer. Another cause of deviations is related to inaccuracies in the joint and arm mechanics and/or control of the arm dynamics during high-speed motion, such as torque saturation due to joint-wise or multibody effects. Normally, such deviations are managed by model-based control provided by the robot manufacturer. Yet another cause of deviations from a programmed pose stems from inaccuracies due to force interaction between the end-effector of the manipulator and the workpiece, but also due to gravity and other forces acting upon the manipulator. Such deviations are also related to joint dynamics around or along the joint motion due to tolerances of bearings and other joint parts.

Light-weight robots and dexterous robots with highly optimized control are becoming more popular for industrial applications. This puts new demands on the model based control since another source of deviations is deflection due to compliance of the manipulator links. A compliant link may be defined as a non-rigid link, i.e. a link displaying some degree of elasticity. A further source of deviations is the compliance of the manipulator joints in directions other than in the direction of the joint rotation, such as in a direction orthogonal to the direction of joint rotation. Industrial robots have much higher compliance than conventional machine tools for machining operations. This gives higher requirements on an elasticity model of the robot to calculate the actual tool center point (TCP) position when forces are acting on the robot.

Attempts have been made to develop a model of link and joint compliance using a quasi-static and dynamic model of a manipulator, such as described in "Modeling and control of flexible manipulators" by Moberg S. published in 2010. The publication characterizes compliant joints as a spring-mass system 25 with four links Link 1-Link 4, three motors M1-M3 and different masses and spring constants as illustrated in FIG. 2. Link elasticity is then modeled by means of a stiffness matrix. However, as Moberg readily admits, modelling the number of non-actuated joints and their locations is not obvious. (Mobergs reference to non-actuated joints will in the following be captured by our more general concept of elastic-DOF representing joints and links that can be deformed according to elasticity models.)

Several types of solutions exist which deal with some types of deviations mentioned earlier, where optical systems for pose measurements and tracking are the most common. Such systems, referred to as external calibration systems, can be used for online compensation of the end-effector motions without parameters for the sources of deviations, or they can be used to calibrate the parameters of the kinematic model. Although a calibration system of today does not capture parameters describing deflections due to force, high-end robots in common application are comparably stiff and therefore useful. In many other cases, either robots are less stiff or the application requirements on accuracy are more demanding, and external sensing or improved compensation is highly desirable. While applicable to large scale production facilities with a large number of robots, the cost of the mentioned external calibration system often exceeds the cost of a single robot. In smaller scale production facilities relying on the operation of one or a few robots, such external calibration systems are not applicable due to prohibitive cost. One example of an external calibration system is described in WO9912082. In addition to calibration, external sensors detecting torque or position of the joints or the tool exchanger can be used to improve robustness against unknown variation in the manipulator or in the manufacturing process, in case there is a force interaction between the tool and the workpiece.

Another approach to calibration is presented in the article "Kinematic Calibration by Direct estimation of the Jacobian Matrix" by Bennet, Hollerbach and Henri presented at ICRA, 1992, in Nice, France. In the article parameters in a Jacobian matrix of a robot are estimated by first clamping the robot in a predefined pose and then actuating the joints of the robot. Based on information from an external force/torque sensor attached to the end-link close to the point of clamping, the unknown kinematic parameters can then be determined. The Jacobian matrix expresses the dependency between endpoint velocities and joint velocities, or correspondingly for the forces/torques. Data obtained from a set of such actuations result in a set of such matrices, which are used to calculate the kinematic parameters. Even with kinematic calibration being performed, also with the force/torque based method neglecting the actuator-to-joint dynamics, deviations due to dynamic forces and force interactions with the workpiece remain.

Thus, determination of the coefficients of a stiffness matrix described by Moberg using conventional manipulator calibration systems as described earlier is either non-trivial or such calibrations systems are simply not designed to measure and compensate link compliance and joint compliance along other directions than the primary direction.

The article "Cartesian compliance model for industrial robots using virtual joints" by E. Abele et al, Prod. Eng. Res. Devel., 2008, describes modeling of a robot structure and identification of its parameters. In FIG. 3*a*, a common approach of an elementary joint 30 is illustrated where a twist between the drive side ($\theta_z$) and the output side of the gear ($q_2$) is illustrated, which applies if the overall elasticity can be mainly attributed to the elasticity of the gears. The robot links and the connection from joint to link are considered inflexible. In FIG. 3*b*, a virtual joint 31 is illustrated with two more DOF than the elementary joint in FIG. 3*a*, and thereby compliance in two more DOF can be considered when establishing a model of the robot structure. However, to be able to measure the joint compliance, only one joint at a time is loaded. That is, while measuring axis (i) all axes from the base to the preceeding axis (i-1) have to be clamped, with the identified axis as the first freely moving joint, thus giving a rather time consuming process of determining any compliance of the robot.

Hence, for the purpose of reducing deviations by compensation based on calibrated models including compliance, the limitations of existing technology implies a need for a more accurate, simple and inexpensive way of determining such robot link and joint parameters.

SUMMARY

It is an object of the present invention to solve at least some of the drawbacks with existing technology mentioned earlier.

According to a first aspect, the object is at least partly achieved with a method for determining at least one property associated with a selected axis of a manipulator, wherein the manipulator is configured to be controlled by a controller, and comprises at least one axis comprising a joint and a linkage connected to the joint, wherein the joint is configured to be actuated by an actuator. The method comprises:
clamping a movable part of the manipulator to a point in space by controlling the manipulator such that the manipulator attains a clamped kinematic configuration;
selecting an identification joint set comprising at least one joint of the manipulator, wherein the at least one joint of the identification joint set is configured to control and monitor said selected axis whose associated at least one property is to be determined;
selecting an excitation joint set comprising at least one joint of the manipulator which for the clamped kinematic configuration of the manipulator is configured to excite at least one link connected to the at least one joint of the identification joint set;
selecting a clamping configuration joint set of the manipulator;
actuating said excitation joint set, such that said selected axis is excited while controlling the clamping configuration joint set such that the clamped kinematic configuration is maintained;
monitoring one or more quantities related to actuator torque and/or joint position for at least one joint in the identification joint set and/or excitation joint set;
determining the at least one property of said selected axis based on the one or more quantities monitored.

With the method it is possible to determine properties such as compliance of links and joints of the manipulator, and thereafter use the properties to attain a more accurate control of the manipulator. There is no need to dismount any components of the manipulator to determine the properties, thus a faster and more cost efficient method than previous methods is achieved.

According to one embodiment, the method comprises determining the at least one property of the selected axis based on a combination of the monitored one or more quantities related to actuator torque and/or joint position. Thus, a greater number of properties can be determined.

According to one embodiment, the method comprises determining at least one property each for a plurality of selected axes of the manipulator. Thus, several properties can be determined.

According to a further embodiment, the method comprising repeating the method wherein the attained clamped kinematic configuration of the manipulator is different from an, in the method, previously attained clamped kinematic configuration of the manipulator, and determining at least one property of the selected axis based on the determined properties of the selected axis in the different clamped kinematic configurations. By varying the clamped kinematic configuration a plurality of quantities can be obtained in order to more accurately determine the at least one property.

According to another embodiment, the step of determining the at least one property comprises determining a manipulator stiffness matrix for the manipulator based on the one or more monitored quantities. The manipulator stiffness matrix is made up of one or several component stiffness matrices, e.g. link stiffness matrices, in order to determine stiffness properties of the complete manipulator.

According to one embodiment, the method comprises organizing properties according to a structure of the manipulator stiffness matrix that relates possibly unknown displacements of links and joints to torques and forces such that any combination of serial and parallel linkages can be considered modeled, thereby facilitating the determination of these properties. The properties may be manipulator stiffness parameters.

According to a further embodiment, the step of determining the at least one property comprises performing an optimization based on the one or more monitored quantities. The manipulator may be provided with a sensor configured to generate a sensor signal with sensor data when in the clamped kinematic configuration, and wherein the method further comprising including sensor data from the manipulator in the optimization. The sensor may be a force sensor configured to generate a sensor signal with force data.

According to one embodiment, the at least one joint of the clamping configuration joint set is not part of the identification joint set and the excitation joint set. Thus, the joints of the clamping configuration joint set will not effect the other sets of joints, nor the monitored quantities. According to one embodiment, the clamping configuration joint set is controlled such that the clamping configuration joint set substantially does not influence the determination of the at least one property associated with the selected axis.

According to one embodiment, the method comprises comparing the at least one property with a previously obtained property value or predefined property value, determining a difference value between the at least one property and the previous obtained property value or predefined property value, comparing the difference value with a difference threshold value and determining wear of the manipulator based of the result of the comparison. Thus, wear of the manipulator may be determined by analyzing if the determined property differs from any previously obtained property values, or a predefined property value representing a property with, e.g. essentially no wear.

According to one embodiment, the manipulator is a parallel kinematic manipulator. The manipulator may instead be a serial kinematic manipulator. Thus, the method can be used in any case.

According to a further embodiment, the method comprises obtaining specific kinematic parameters by means of kinematic calibration of a manipulator, and updating kinematic parameters of the manipulator based on the at least one determined property of the selected axis. Thus, the manipulator may be better calibrated using the obtained at least one property. The kinematic parameters to be updated may be nominal parameters of the manipulator or kinematic parameters obtained with traditional calibration methods.

The disclosure also relates to use of the determined at least one property determined according to any of the method steps as disclosed herein, for updating nominal kinematic parameters of the manipulator. Further, the method relates to use of the determined at least one property determined according to any of the method steps as disclosed herein, for updating robot programs or motion control parameters of the manipulator. Thus, the accuracy of the manipulator control can be improved.

According to a second aspect, the object is at least partly achieved by a system for determining at least one property associated with a selected axis of a manipulator. The system comprises a manipulator with at least one axis comprising a joint and a linkage connected to the joint. The system further comprises at least one actuator configured to actuate the joint and a controller configured to control the manipulator, wherein the controller comprises a control unit and a computer readable storage unit comprising instructions configured to make the control unit:

clamp a movable part of the manipulator to a point in space by controlling the manipulator such that the manipulator attains a clamped kinematic configuration;

select an identification joint set comprising at least one joint of the manipulator, wherein the at least one joint of the identification joint set is configured to control and monitor a link of said selected axis whose associated at least one property is to be determined;

select an excitation joint set comprising at least one joint of the manipulator which for the clamped kinematic configuration of the manipulator is configured to excite at least one link connected to the at least one joint of the identification joint set;

select a clamping configuration joint set of the manipulator;

actuate the excitation joint set, such that the selected axis is excited while controlling the clamping configuration joint set such that the clamped kinematic configuration is maintained;

monitor one or more quantities related to actuator torque and/or joint position for at least one joint in the identification joint set and/or in the excitation joint set;

determine the at least one property of the selected axis based on the one or more quantities monitored;

generate a property signal indicating the at least one property.

According to a third aspect, the disclosure relates to a computer program (P) associated with a system, wherein the computer program (P) comprises computer instructions configured to cause a control unit to perform the method according to any of the steps as disclosed herein.

According to a fourth aspect, the disclosure relates to a computer program product comprising computer instructions stored on a computer readable storage medium to perform the method according to any of the steps as disclosed herein. The disclosure also relates to a computer program product comprising the at least one property obtained when performing the method according to any of the steps as disclosed herein, wherein the at least one property is stored on a computer readable storage medium.

BRIEF DESCRIPTION OF THE DRAWINGS

Below the invention will be described in detail with reference to the appended figures, of which.

DETAILED DESCRIPTION

Definitions of Features

Figure 1:
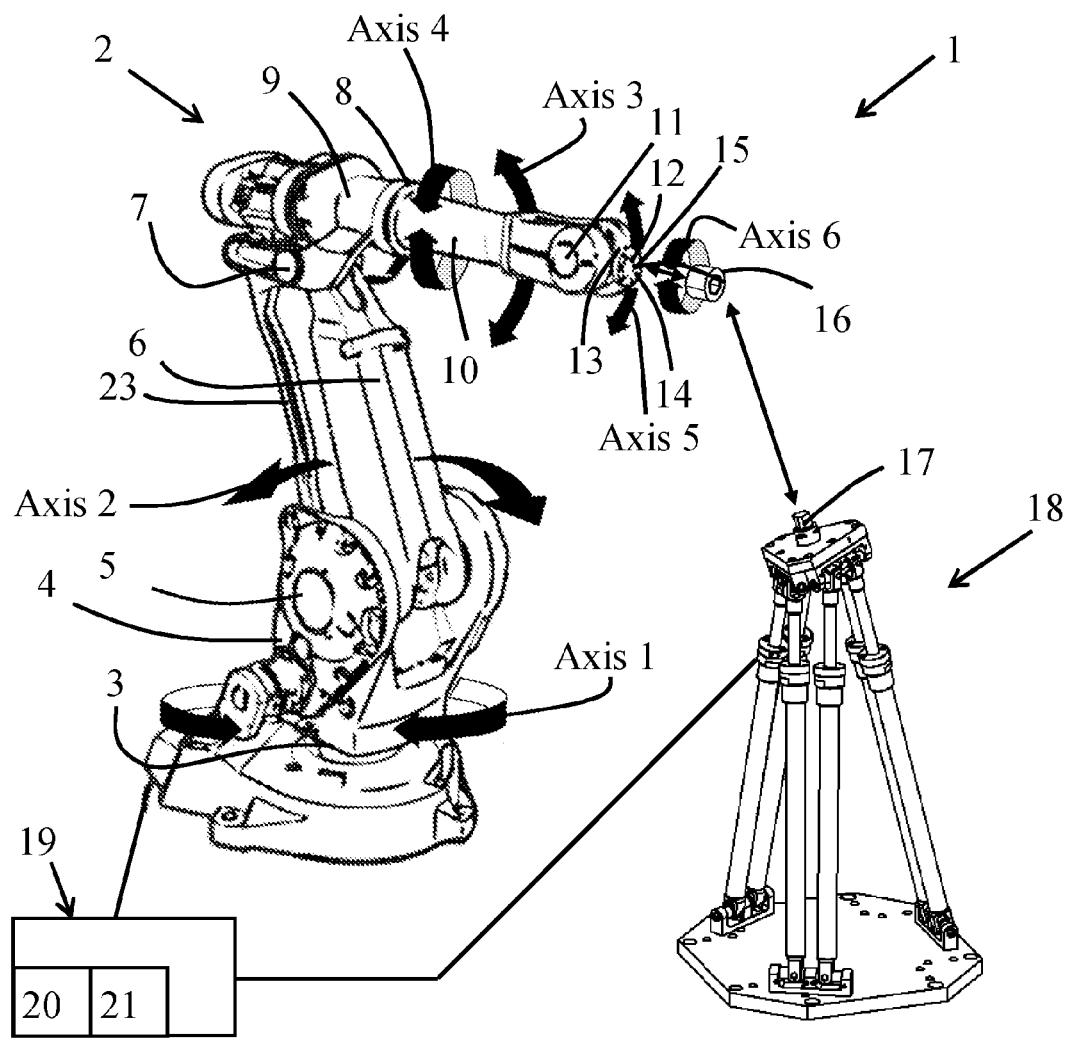
FIG. 1 shows a system for determining link and joint properties of a manipulator according to one embodiment of the present invention.
Figure 2:
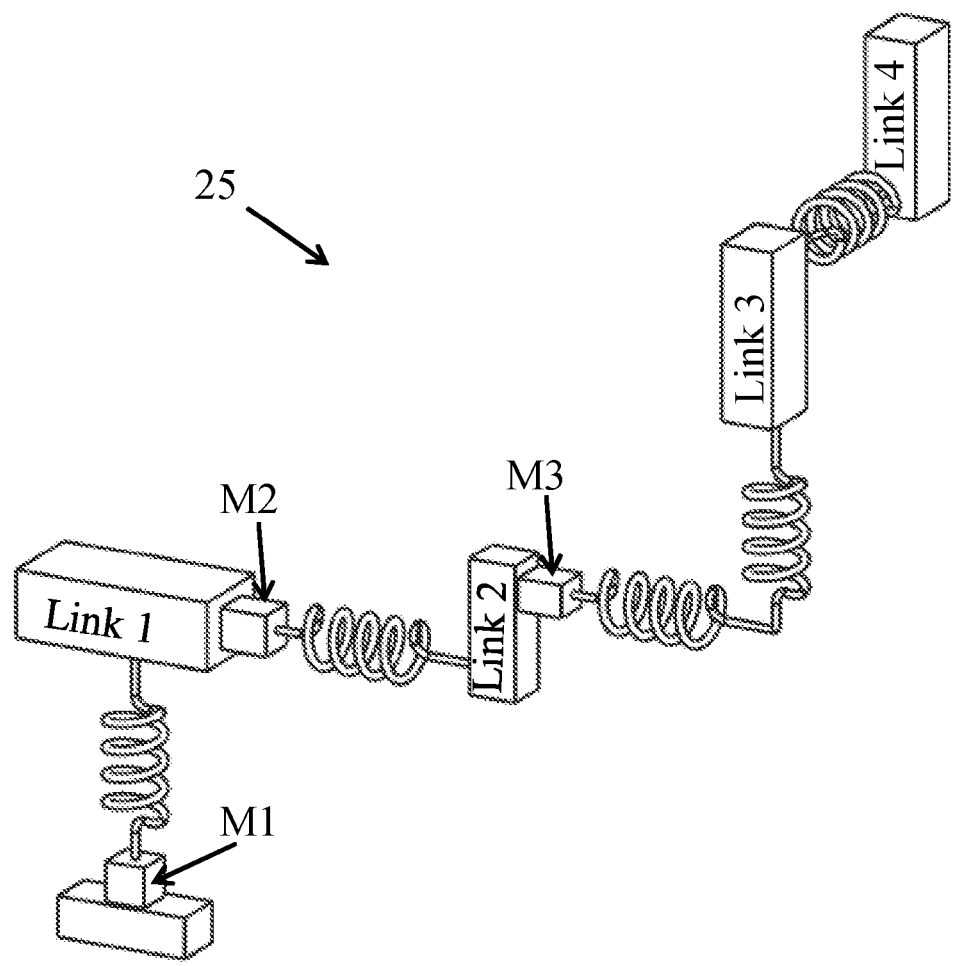
FIG. 2 illustrates a prior art model of a manipulator with link and joint compliance.
Figure 3A:
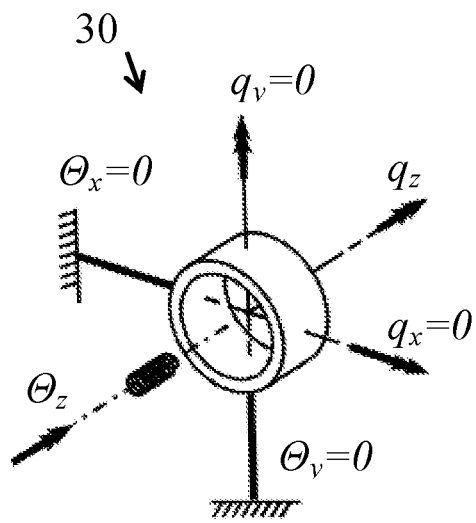
FIG. 3a shows a prior art model of an elementary compliant joint.
Figure 3B:
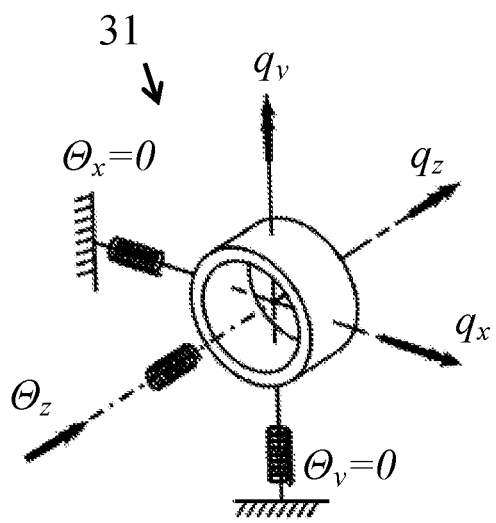
FIG. 3b shows a prior art model of a joint with compliance in directions other than the DOF of that joint.

Robot: A combination of a manipulator and a controller that is configured to control the movement of the one or several axes of the manipulator.

Manipulator: A mechanical arm comprising one or several axes forming one or several kinematic chains.

Axis (plural: axes): A joint and a linkage, including motor for actuation and any drive train.

Linkage: One or several links that are interconnected by joints.

Stiffness: Is the rigidity of an object, defined as $k=F/\delta$ for an elastic object with one DOF, where F is the force applied to the object, and $\delta$ is the displacement produced by the force along the same DOF, or $k=M/\theta$ defining rotational stiffness, where M is the applied moment or torque, and $\theta$ is the rotational displacement produced by the applied moment, or $k=M/\delta$ describing how torque gives rise to translation, or $k=F/\theta$ describing how force gives rise to displacement.

Compliance: The inverse of stiffness.

Compliant link: A non-rigid link. A compliant link has its mass distributed between the two joints it connects and therefore formally has infinite DOF and infinite series of resonant modes due to the physics of a distributed mass. For the current invention only the lowest resonance frequency is relevant, as an indicator of the compliance of links with a certain mass. That frequency can be measured in free motion, and it can also be used as a performance limitation, but it is not a core part of the method. Correspondingly, the inertia of the link itself can be approximated by a lumped mass at the center of gravity. Moreover, the elasto-dynamic model determined in clamped configuration is the corresponding quasi-static model that is sufficient for compensation for deviation due to process forces. With this simplification, a compliant link is considered to have six additional DOF that specify the end of the link (the pose of next joint in the kinematic chain) relative to the beginning of that link (the pose of the preceding joint).

Component stiffness matrix: A matrix used to model component deformation such as link deformation due to the joint forces and/or torques. The stiffness matrix is used as a linear mapping, assuming link deflections are small compared to link sizes and motions. The link deformation can be defined in a local coordinate system of the link and thereafter transformed to a global coordinate system.

Manipulator stiffness matrix: Whereas a component stiffness matrix may be constant, the stiffness of the manipulator varies with the configuration, which is defined by the joint coordinates (having manipulator-DOF elements). Here, the difference between the motor and the link translation can be omitted in practice, since even large drive-train effects have a rather small influence on the translation. That is, apart for singular poses the motor angles represent the joint angles sufficiently well. For each single configuration the link stiffness matrices can be put together, thereby forming a larger Manipulator stiffness matrix (MSM). The MSM is also referred to as Global stiffness matrix.

Orthogonal joint compliance: The compliance of a link in any direction that is orthogonal to the motion described by a free coordinate of the joint representing the motion of the joint.

Non-orthogonal joint compliance: The compliance of a link along or around the coordinate of motion. Non-linear compliance is included in the properties of the drive-train of the joint (which may be determined first and hence possible to compensate for, or alternatively avoided by selecting a tailored clamped pose configuration), and hence for understanding the current invention it can be assumed that the non-orthogonal joint compliance is linear.

Link gravity force: For an SKM, the link mass results in gravity forces that need to be balanced by joint torques of the adjacent axes. For a PKM, sets of parallel links need to balance the gravity forces correspondingly. In both cases, potentially for any joint depending on kinematic configuration, (process or gravity) forces acting on the end-flange (e.g. the gravity of the mounted end-effector, or the reaction forces due to a clamped position) may add to the forces acting on each axis. A feature of clamping experiments is that gravity forces may be balanced from the end-flange side, thereby enabling small/zero joint torques (e.g. for determining the backlash) despite large gravity forces. Any of the above cases are covered by the following, although the descriptions focus on the SKM case for the sake of clarity and common industrial usage.

Joint gravity influence: Typically, for practically all robots on the market today, the largest effect of gravity is by the corresponding rigid-body influence on the preceding joints in the kinematic chain. This gravitational influence is best measured in free-space motion, most practically at the time of free-space friction measurements (but considering the average torque during slow bi-directional motion rather than the hysteresis that reflects the friction), with sufficient many kinematic configurations to determine the actuator torque required to counteracting the gravity force. The gear ratios are known (from data sheets or from measurements that are trivial for the skilled person), and hence the linear transformation between joint and link torques are known, and hence the (rigid) link gravity force can equivalently be considered at the motor side of each joint. Non-symmetric friction may harm the accuracy of gravity identification, so in that case several different payloads (changing gravity but not friction) can be used.

Figure 8:
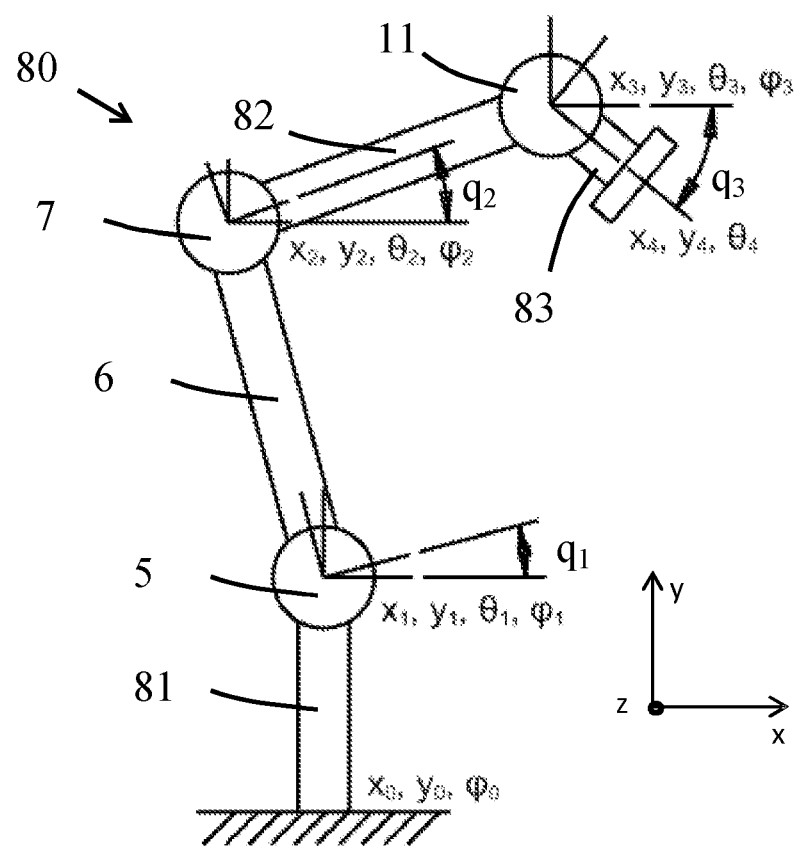
FIG. 8 illustrates one example of representation of deviations due to compliance, corresponding to a certain kinematic configuration of the manipulator in FIG. 1.

Link gravity influence: In addition to the joint gravity influence, the gravity of a compliant link influences the shape of the link itself (see FIG. 8 depicting the 2D case), which means the gravity adds to the link bending.

Clamped kinematic configuration: A configuration of the manipulator where the manipulator (or any movable part of it) is clamped in a well-defined pose.

Identification joint set: A set of joints, including at least one joint, that in a certain clamped configuration are configured to control and monitor the axis, or axes, that relate to the corresponding set of links with properties to be determined. This configured control and monitoring is accomplished by means of some controller, which thus controls this set of joints that drive the links with the properties to be determined.

Excitation joint set: A set of joints, minimum and typically one (e.g. the one joint given the best conditions for exerting forces to enable the identification), which for the current clamped kinematic configuration excites the one or several links driven by the one or several joints belonging to the Identification joint set. To "excite" here means to effect the one or several links driven or actuated by the joints belonging to the identification joint set.

Clamping configuration joint set: Joints that are neither belonging to the excitation joint set nor to the identification joint set. These joints are controlled such that a kinematic configuration is reached such that these joints substantially do not influence the identification of axis properties, and such that the clamped pose is maintained.

Property: A property is any of a linear compliance of a joint or a link, orthogonal compliance of a joint, non-linear compliance of a link, or orthogonal backlash of a joint. A property may be determined as a stiffness value for links and joints.

System

In FIG. 1 a system 1 according to one embodiment is illustrated and will now be explained with reference to this figure. The system 1 comprises a manipulator 2, here illustrated with six joints 3, 5, 7, 8, 11, 12 and six links 4, 6, 9, 10, 13, 14. Each joint 3, 5, 7, 8, 11, 12 is configured to be actuated by an actuator such as a motor (not shown), either directly or indirectly via a transmission (here referred to as a drive train, not shown), such that motor rotations are translated into lower-speed motions as indicated by the thick arrows. The thick arrows illustrate how each link 4, 6, 9, 10, 13, 14 can be moved around its connected joint 3, 5, 7, 8, 11, 12. The joint 3 and its thereto connected link 4 together makes up Axis 1. The direction of movement for the Axis 1 when the link 4 is rotated around joint 3 is indicated by the thick arrows denoted Axis 1. Further, the joint 5 is connected to a link 6 forming Axis 2. The direction of movement for the Axis 2 when the linkage 6 is rotated around joint 5 is indicated by the thick arrows denoted Axis 2. Axis 3 is the motion of link 9 around joint 7, but the actuation comes from a drive train that effect the link 23, which we refer to as a parallel joint for Axis 3. As follows, the joint 8 together with link 10 forms Axis 4, the joint 11 together with link 13 forms Axis 5 and the joint 12 together with link 14 forms Axis 6. Their direction of movement, respectively, is indicated in the figure by the arrows. For simplicity, and since the present invention concerns the arm-side joints and links mechanism, the actuators/motors and drive-trains being part of each axis are not shown or referenced.

A tool exchanger 16 (shown detached in FIG. 1) can be mounted with its manipulator side to a tool-mounting flange 15, and various tools or end-effectors may be attached to the tool exchanger 16 on its tool side.

Such a six joint manipulator 2 is also referred to as a six DOF manipulator as it can position an attached end-effector attached to the tool-mounting flange 15 in six DOF in a workspace of the manipulator 2. The system 1 may comprise any number of joints, i.e. one or a plurality of joints, and any number of links connected to the one or several joints, and the numbers are not critical for performing the invention.

The system 1 further comprises a controller 19 comprising a control unit 20 and a computer readable storage unit 21 with instructions configured to perform the method according to any of the embodiments as will be described herein. More specifically, the system 1 is configured to determine at least one property associated with a selected axis of a manipulator 2, and the controller 19 is configured to generate a property signal indicating the at least one property.

The controller 19 is configured to control movement of the manipulator 2 and optionally of a docking item 18. Depending on preference, the controller 19 may be external in the form of a manually or automatically operated controller 19 (or a digital computer) or internal, i.e. built-in into the manipulator 2 itself.

The manipulator 2 may comprise built-in sensors, such as encoders or resolvers attached to motor shafts or similar, to sense the actuator positions of the joints 3, 5, 7, 8, 11, 12 in order to sense an end-effector position in relation to an internal coordinate system that is spanning a joint space and to relate the end-effector position to an external coordinate system (usually spanning a Cartesian space). These sensors, normally used for the feedback control of the manipulator, can also according to the current invention be used to determine data that can be used to determine joint and link properties such as compliance. Parameters such as motion speed, force, or stiffness can be transformed between the joint space and the Cartesian space. In a similar way, parameters describing the actuator space, such as joint motor angles driven by force or torque, can be translated into parameters describing the joint space, such as joint positions as known from kinematic calibration. Hence, given appropriate control conditions, data from sensing of motor quantities can be expected to contain information about overall properties of the manipulator, such as the compliance of links and thereby deviations of end-effector positions due to the payload and external forces.

The manipulator 2 may be docked or attached to a clamping item 18 as illustrated in the figure or to another clamping item such that the manipulator 2 attains a clamped kinematic configuration. One way to achieve a clamped kinematic configuration is to let the controller 19 (automatically or by manual commands) control the manipulator 2 such that a movable part of the manipulator 2 reaches a point in space where a clamping item 18 is located. The movable part is typically the end flange at the last link of the manipulator 2, preferably equipped with a tool exchanger 16. The tool exchanger 16 preferably fits on its tool side with a mating part of the clamping item 18, e.g. a protrusion 17. The point in space is here thus determined by the position of the protrusion 18. The controller 19 may also control the clamping item 18 to provide a certain point in space for the manipulator 2 to dock onto. Any combination of manipulator motion and clamping item motion can be used, as long as the manipulator attains a desired clamped state.

Depending on what properties to be obtained, one or a few fixed points defined e.g. by the tool-side of the tool exchanger 16 can be provided in the workspace of the robot. Using a reconfigurable clamping item 18 as shown in FIG. 1 permits the docking to take place at one location, e.g. fixed and soft by unlocked legs of the clamping item 18 with compliant end-stops, permitting high-speed docking. Thereafter the clamping takes place by locking the legs of the clamping item 18 at a location set by the manipulator 2. The locations may be manually or automatically controlled.

The points in space, or the clamping item 18, are for simplicity assumed to be stiff compared to the compliance of the manipulator, but the method can easily be extended to compliant clamping. That is, the clamping item 18 not being stiff, but having a known or predetermined stiffness. The stiffness of the clamping item 18 can be measured by position and force sensors, and determined by standard methods or according to the current invention as an extension of the manipulator 2. Special cases are multiple manipulator arms, with one or several controllers, docking to each other and exerting clamping forces in an alternating manner. The docking item 18 shown in FIG. 1 is a parallel mechanism that comprises an efficient way of providing re-locatable but stiff clamping poses.

Another example of a parallel mechanism can be seen as part of the manipulator 2 in FIG. 1, where the actuation of the joint 7, thus Axis 3, is via a parallel bar 23 connected to the link 9. That bar could be considered being a parallel link within a PKM being part of the overall SKM. Instead, the link 9 can be considered as being part of the joint 7. It is then assumed that the link 9 only transfers forces along its direction, i.e. it only transfers pull and/or push forces without significant bending and/or torsion such that the elasto-dynamic properties of the link 9 can be included in the joint properties that can be determined according to, e.g. the method described in the WO2014065744A1. With this assumption fulfilled, this type of joint is referred to as a parallel joint and the manipulator being an SKM.

Some high-precision robots and/or machines have parallel arrangements within the drive-train, for instance in terms of dual motors acting partly against each other to avoid effects of backlash. The situation that there are more motors and/or actuators than there is DOF is referred to as over-actuation of the joint in the described case. The properties of both actuation branches can then be determined one by one, by dual experiments for a dual-motor actuated drive train. Thus, an over-actuated joint is a special case of the method presented in WO2014065744A1 and is not further covered here. In case of parallel joints or parallel links, over-actuation means loading some joint and links against each other.

The mentioned avoidance of over-actuation means that some actuator or joint are made passive, temporarily during the identification of the properties of interest. A robot can also include a passive joint, for special use during normal operation or reconfiguration. Such a joint can be locked in a specific angle that makes the remaining kinematic configuration particularly well suited for the task at hand. It can temporarily be passive as part of special dynamic behavior (such as a swinging motion), or it can obtain a resulting angle due to some external mechanism. In any case, passive joints can be part of the kinematic configuration in the following description. A manipulator 2 is by default and according to current industrial practices fully actuated, whereas an under-actuated manipulator has a lower number of axes than DOF. The passive joints represent the underactuation. Those joints and the connected links are then either possible to manage by the same method with adequate locking and/or fixation or such joint does not influence the motion via the properties of interest, and hence passive joints are manageable but not further described here.

Yet another type of manipulator is one that has a manipulator-DOF that is higher than the required end-effector DOF, the latter possibly being less than six in case of applications and tools that by themselves leave one or several DOF unspecified. Typical examples are welding and milling. One axis of rotation ideally then does not matter from an application point of view, the tool being rotational symmetric. Therefore, many robots for arc-welding have only five DOF, and in material handling there are robots with four DOF for palletizing. Nevertheless, most robots today have six DOF, then resulting in, e.g. one redundant DOF for arc-welding and two DOF for palletizing. A manipulator with at least one redundant DOF is a redundant manipulator, which permits motions in the so called null space; a null-space motion consists of moving joints and links but not effectively the end-effector. Although such a manipulator in principle is unnecessarily expensive (due to the extra axis/axes), the kinematic redundancy is practically useful (e.g. for best stiffness during milling, orientation of hoses to the welding gun, etc.). Since the redundant motion of the tool does normally not coincide with the motion resulting from any specific axis, all axes of the manipulator need to be well controlled, and hence the need to identify manipulator properties remains.

Redundant manipulators with two or more arms, each with seven or more DOF like the human arm, are increasingly important since they are well suited for performing tasks at human workplaces. Such a manipulator permits for instance orientation of an elbow such that better tradeoffs between reachability, force, stability and space can be made. A typical application is assembly, normally requiring six DOF for the workpiece and for the tool holding it, thus leaving one DOF redundancy forming a null space. The null-space motion then consists of moving joints and links but not the end-effector. Null-space motions can be carried out, thereby changing the kinematic configuration, also if the end-effector has obtained a clamped pose. That assumes, however, that a perfectly stiff robot also has a perfectly correct kinematic model to avoid a physically impossible over-actuated configuration in some dimension, or that a robot with some kinematic errors also has some compliance. The latter is the realistic and typical situation with compliant robots, which leads into the issue of coping with variations and deviations in practical applications due to joint and link compliances.

Compliance

Figure 4:
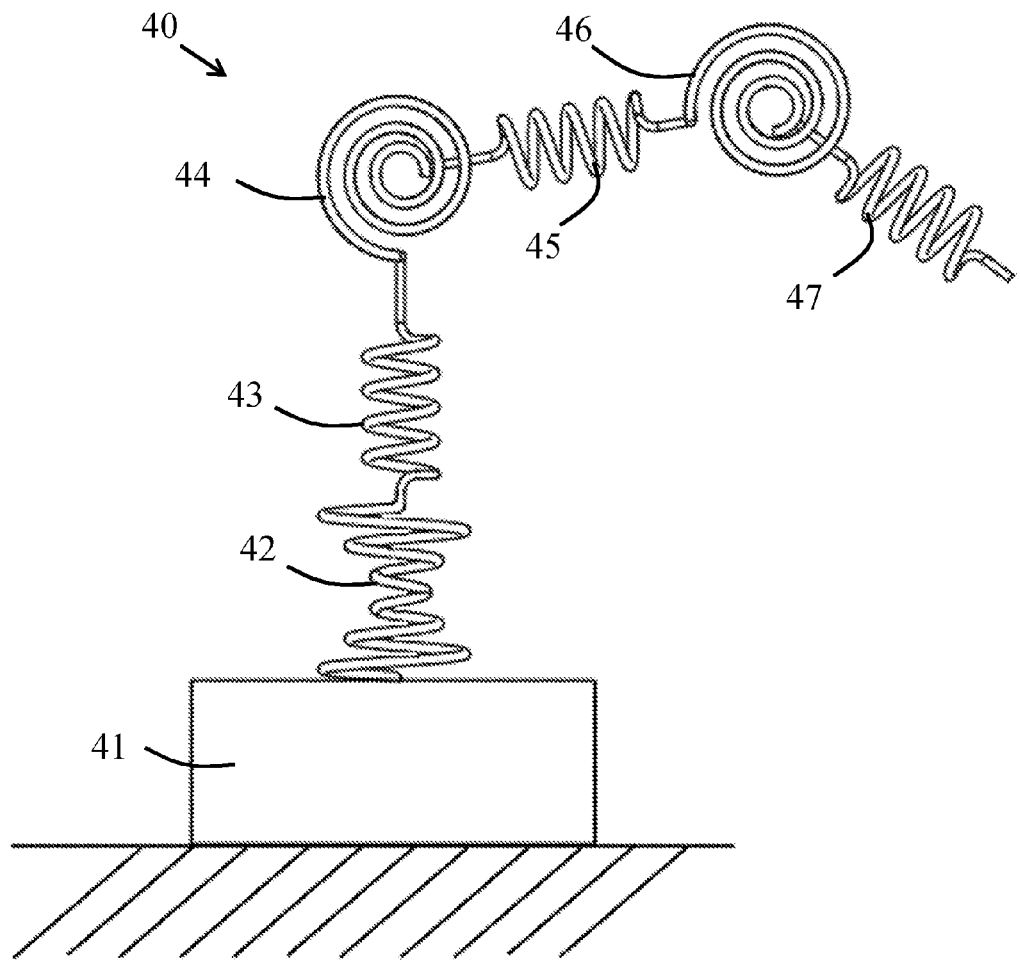
FIG. 4 illustrates in a simplified way a manipulator with compliant joints and links.

FIG. 4 schematically illustrates a model of the elasticity of a manipulator 40 with elastic links 43, 45 and 47 and elastic joints 42, 44 and 46. By modeling the manipulator structure using elastic joints and elastic links a compliance behavior of the manipulator 40 can be described. The manipulator 40 is attached to a rigid base 41. Each of the elastic links 43, 45 and 47 is represented by a linear spring element with a certain spring constant characterizing the inverse of the compliance of the link. The elastic links 43, 45, 47 are each considered to have a constant length. The elastic joints 42, 44 and 46 are each represented by a spring element as illustrated in the figure. Further, the spring elements are considered to give rise to rather small deflections. In the following it will be described how the illustrated elasticity gives rise to compliance of links and joints of a manipulator 2 and how the compliance can be determined as properties of the links and joints. The properties may comprise, e.g. linear compliance of a joint or a link, orthogonal compliance of a joint, non-linear compliance of a link, or orthogonal backlash of a joint.

Figure 5:
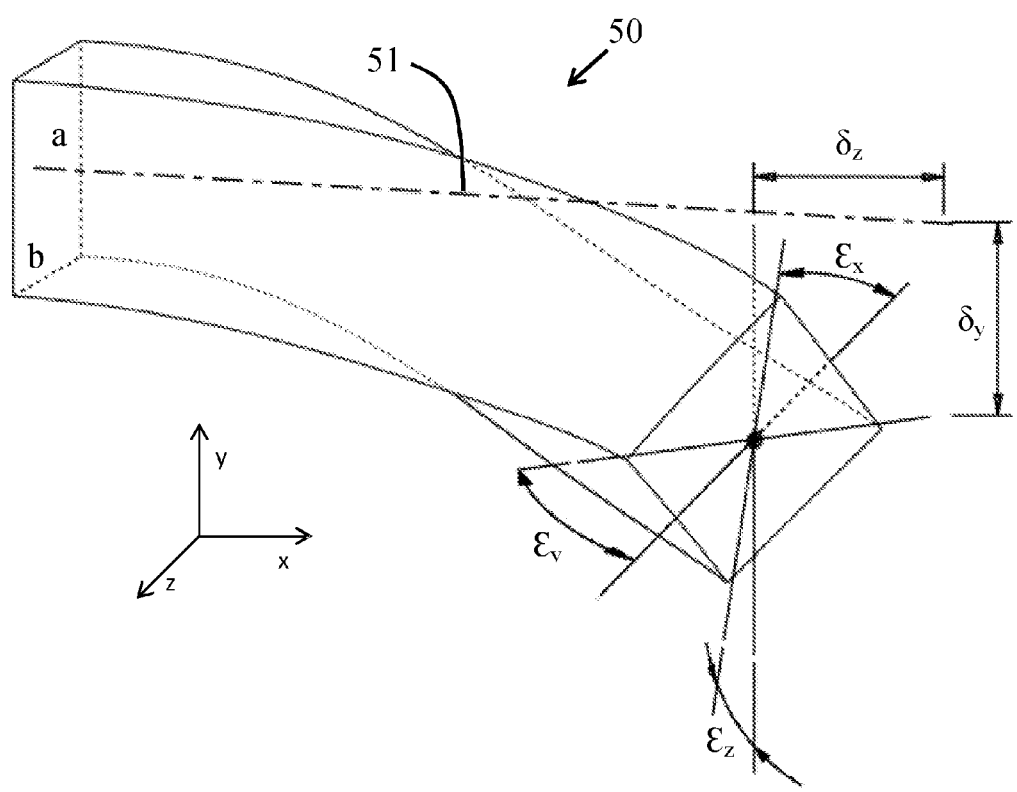
FIG. 5 illustrates compliance of an ideal beam.

FIG. 5 illustrates an ideal elastic beam 50 under influence of force and torque when one of its ends is rigidly held and the other end is free to move. With ideal elastic beam is here meant that for small elastic deformations the beam has an essentially linear behavior. When the beam 50 is no longer under influence of force and torque, the beam 50 will return to its original shape and orientation and thus here extend uniformly along a main axis 51. The beam 50 thus extends along the main axis 51 and has a height a and a width b. A link of a manipulator may be characterized as an ideal elastic beam 50. As can be seen from the figure, the beam 50 deflects when it is exerted to force and/or torque by bending and twisting away from the main axis 51 of the beam 50. Moreover, an elasto-dynamic model of the manipulator 2 determined in a clamped configuration of the manipulator is the corresponding quasi-static model that is sufficient for compensation of deviations due to process forces. That is, the full dynamic model with more accurate inertias and multiple resonances (each formally contributing with some additional elastic-DOF) can be used internally in the controller 19, but can be ignored in the following since we deal with accuracy for robots to better perform their tasks rather than the dynamics of the joint control. With this simplification, we can consider a compliant link having six additional elastic-DOF that specify the end of the link, i.e. the pose of next joint, relative to the beginning of that link, i.e. the pose of the preceding joint. Compliance of the beam 50 may be characterized by angular deviation from the main axis 51 using translational and angular displacements $\delta_z$, $\delta_y$, $\epsilon_x$, $\epsilon_y$ and $\epsilon_z$, as illustrated in the FIG. 5. The x-axis extends along the main axis 51 of the beam 50, the y-axis extends along the height a of the link 50, and the z-axis extends along the width b of the link 50. In the figure $\delta_z$ and $\delta_y$ represents elongation along the z- and y-axes respectively, $\epsilon_x$ represents torsion of the beam 50, $\epsilon_y$ represents rotation around the y-axis and $\epsilon_z$ represents rotation of the beam 50 around the z-axis.

Figure 6A:
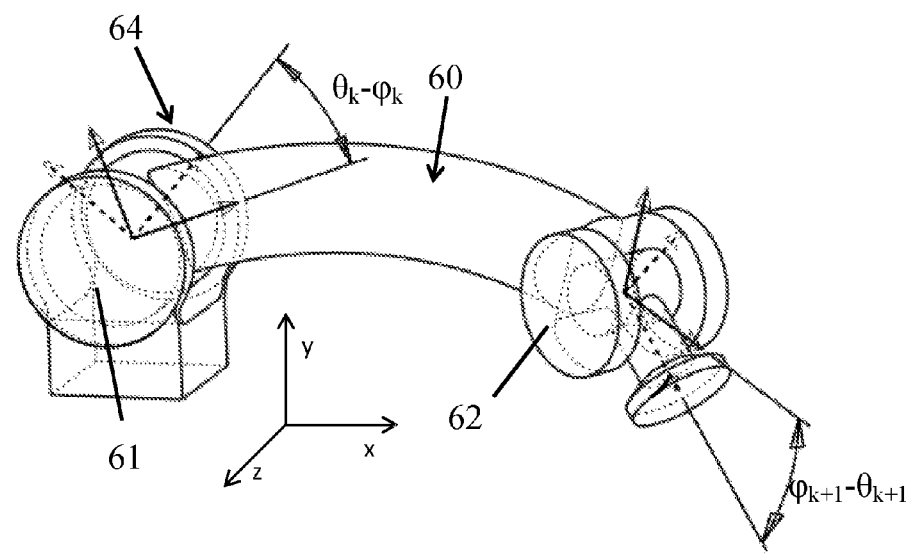
FIG. 6a illustrates a part of a manipulator with a compliant link and its adjacent joints with denoted compliance.

FIG. 6a illustrates an elastic link 60 in a three dimensional coordinate system defined by the axes x, y and z corresponding to the coordinate system in FIG. 5. The elastic link 60 essentially has the elastic behavior of the ideal beam 50 as shown in FIG. 5, and is here exerted to the corresponding force and/or torque as for the ideal beam 50. The bent shape of the link 60 will of course depend on its shape and the materials it is made of. Typically, the bent shape can be computed using the well known finite element method (FEM), and such an analysis (e.g., of a single link) can even be incorporated in the computational scheme according to the present invention (that will be described based on the same theoretical basis as FEM is based on). However, reflecting the industrial needs for end-effector accuracy, from now on we will ignore the shape of the loaded links, and instead formulate an example framework that supports the identification of parameters that will result in the desired accuracy when used in compensations by means of the controller 19. The elastic link 60 connects a first joint 61 and a second joint 62. The link 60 and the first joint 61 together with its drive-train form an axis 64, and the first joint 61 is configured to rotate the link 60 around the z-axis. The link 60 mainly extends along the x-axis, which is directed along a line connecting the joints 61 and 62 perpendicularly to those two axes of rotation in their nominal unloaded state. The x-axis corresponds to the main axis 51 in FIG. 5.

Figure 6B:
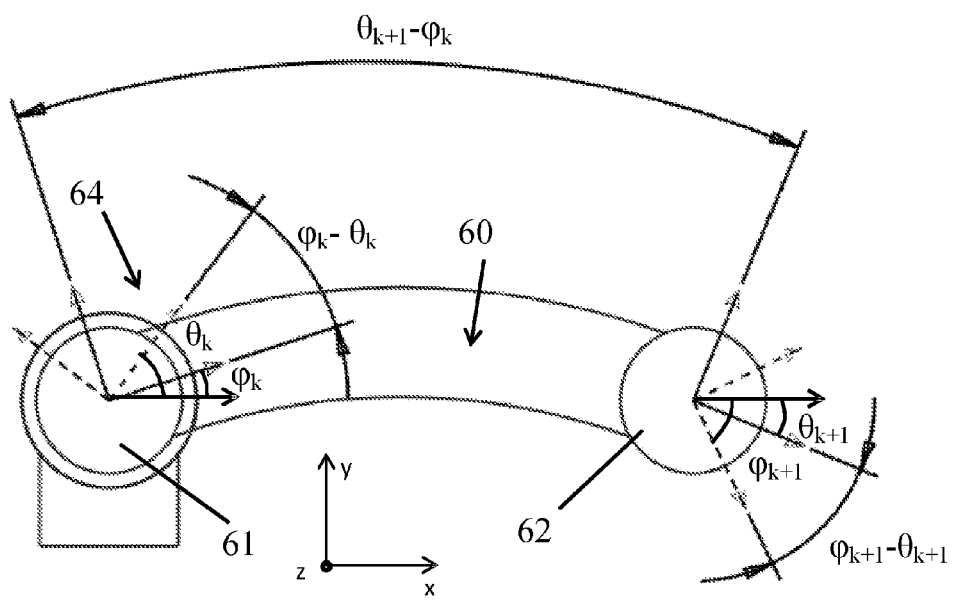
FIG. 6b illustrates a two dimensional perspective of FIG. 6a with denoted joint compliance.

In FIG. 6b, the link 60 is illustrated in two dimensions in the x-y-plane, for a simplified load case in that plane. In the FIGS. 6a and 6b, $\theta_k$ and $\theta_{k+1}$ denote the induced rotational displacement to the joints 61 and 62 around the z-axis from any previous compliant joint and/or link, respectively, and $\phi_k$ and $\phi_{+1}$ denotes the rotational displacement after the joints 61 and 62 around the z-axis due to the rotational displacement of the joint itself and the induced previous rotational displacements $\theta_k$ and $\theta_{k+1}$, respectively. The rotational displacement of the first joint 61 is illustrated as an angle deviation $\phi_k$-$\theta_k$ around the z-axis, thus in the x-y-plane. The rotational displacement of the second joint 62 is illustrated as an angle deviation $\phi_{k+1}$-$\theta_{k+1}$ around the z-axis, thus in the x-y-plane. The bending around the z-axis of the link 60 due to the elasticity of the link 60 is illustrated as an angle deviation $\theta_{k+1}$-$\phi_k$, being the induced rotation to the joint 62 ($\theta_{k+1}$) minus the rotation after the joint 61 ($\phi_k$).

Figure 6C:
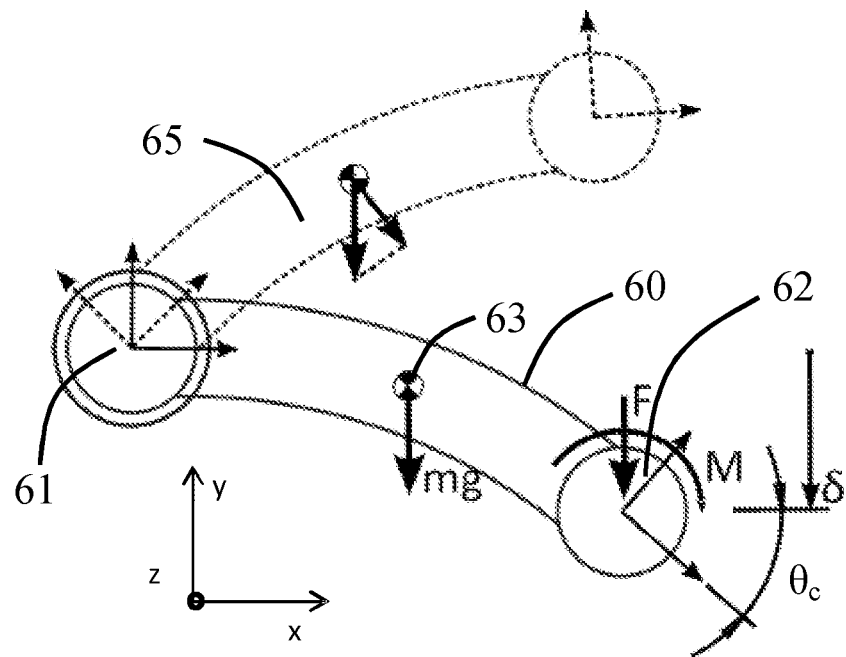
FIG. 6c illustrates the direction of the gravitational force onto a compliant link.

FIG. 6c shows the elastic link 60 in the same two-dimensional view as in FIG. 6b, but with the effect of gravity indicated. The center of mass 63 for the link 60 is here assumed to be in the center of the link 60. The mass of the link 60 gives rise to a gravitational force, which during normal free-space motion is to be counteracted by torques at the preceding joint (not shown). That preceding joint is the left joint 61 in this figure, which includes a force F and a torque M action on the second joint 62 and thereby via the bent link 60 influences the torque balance of joint 61. The resulting amount of rotation at the location of joint 62 is depicted by the angle $\theta_c$, thus rotation around the z-axis. The displacement of the link 60 at the location of joint 62 along the y-axis due to the effect of gravity is indicated as $\delta$ relative to an unloaded (here horizontal) centerline (like 51, but not shown). In FIG. 6c is also the link 60 illustrated when in another possible position depicted by the dashed link 65. Here the same load F and M, expressed in the component coordinate system (that for link 65 is shown by the dashed coordinate axes at joint 61), give the same deviations $\delta$ and $\theta_c$ (not marked for link 65), but the direction of the gravitational force will be different. That dependency on the nominal joint angle (here for joint 61) is straight forward to manage, but as can be understood from FIG. 6c there is also a change of gravity force direction due to the experienced compliance. However, deflections are small compared to motions, and the change of gravity due to compliance is small and can (as done in the following) be neglected for a typical manipulator.

Figure 6D:
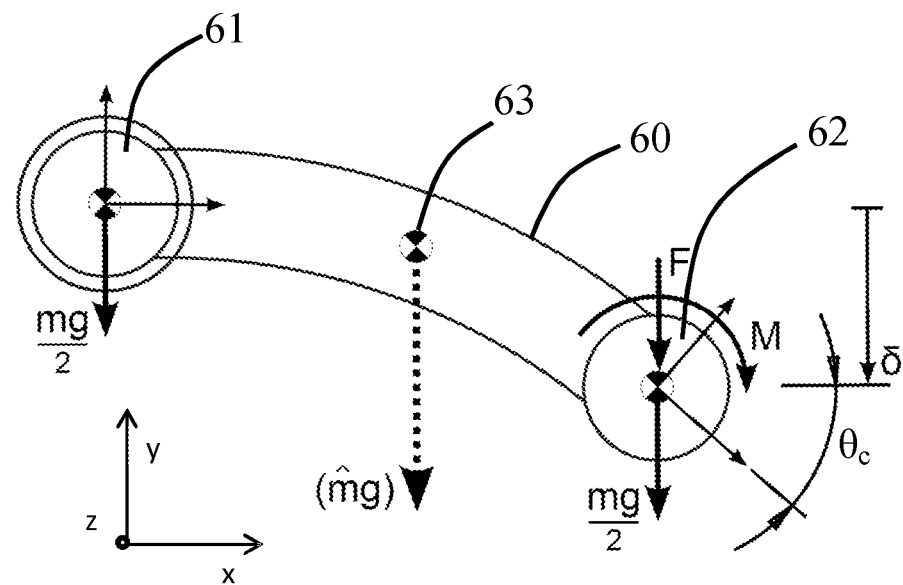
FIG. 6d illustrates how the gravitational force in FIG. 6c may be represented by two parts such that the following equations are simplified.

FIG. 6d shows the same elastic link 60 as in FIG. 6c, where the mass of the link 60 is represented by two corresponding half-mass gravity forces acting on the joints 61 and 62. The effect of the mass of the link 60 on other joints can then be catered for, as well as the own bending of the link 60 due to the effect of mass. This distribution may be used in the following equations. The mass of the link 60 may be predetermined, or estimated by using a method as e.g. explained in the application WO2014065744A1.

Figure 6E:
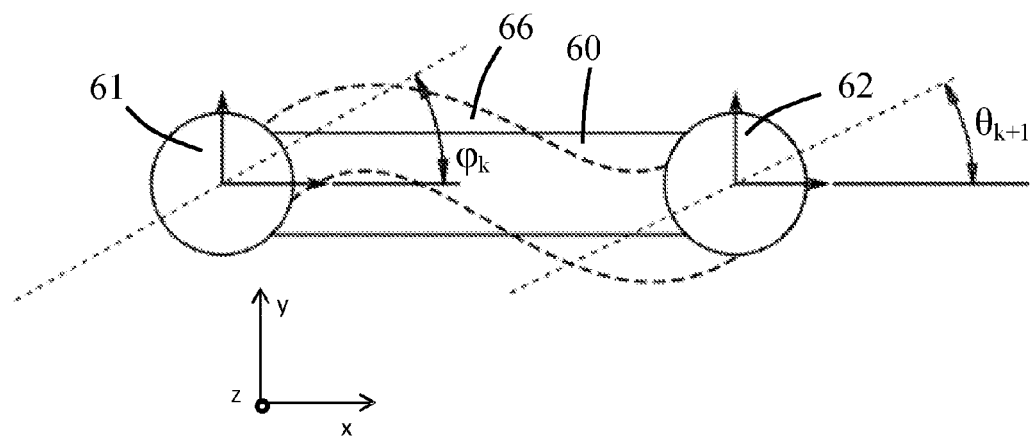
FIG. 6e illustrates a special example of link compliance.

FIG. 6e illustrates the same elastic link 60 as in the previous FIGS. 6a-6d when the link 60 is exerted to force and/or torque such that the positions of the first and second joints 61, 61 are not essentially displaced, but the link 60 itself is shown bent into another possible shape that is a link 66 as illustrated with the dotted lines. The link 60 has been rotationally displaced around the z-axis, thus in the x-y-plane, with an angle $\phi_k$ seen from the first joint 61, and rotationally displaced around the z-axis at the second joint with an angle $\theta_{k+1}$ seen from the second joint 62. The difference of the angles $\phi_k$ and $\theta_{k+1}$ corresponds to $\theta_{k+1}$-$\phi_k$ in FIG. 6b. This kind of deviation can also be determined using the presented method.

In FIG. 6a-6d an isolated case of a link 60 with two thereto connected joints 61, 62 has been illustrated, and the resulting compliance in different directions and angles has been parameterized. In the following a method will be described how these parameters can be obtained, and also how properties of compliance of a more complex manipulator 2 (FIG. 1) can be obtained.

Figure 7:
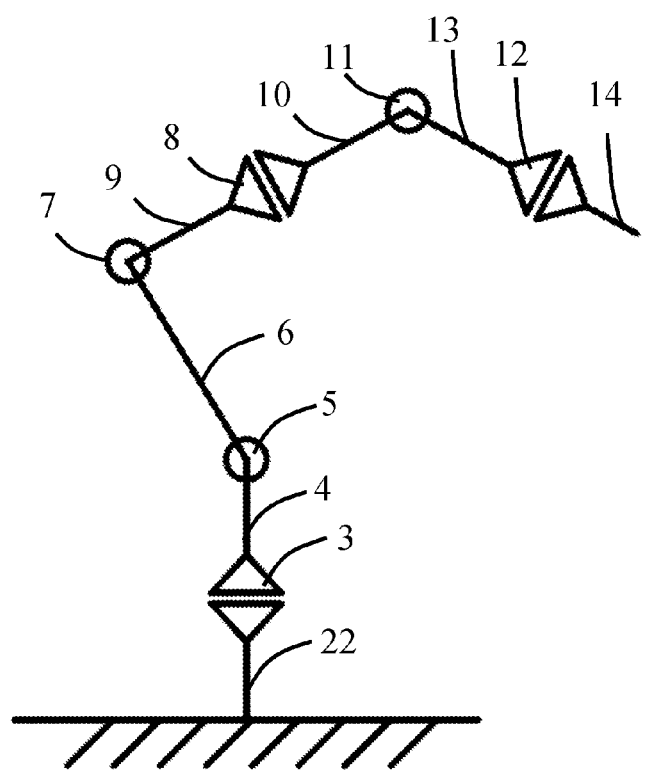
FIG. 7 illustrates a kinematic diagram of the manipulator in FIG. 1.

For the purpose of explaining the method, a kinematic diagram of the manipulator 2 is illustrated in FIG. 7. The kinematic diagram illustrates the connectivity of different links and joints of the manipulator 2. As illustrated, the manipulator 2 is connected to a rigid base with a link 22. The base and link 22 corresponds to the base to which the joint 3 is connected in FIG. 1. The attachment of the base of the manipulator to a ground plate or to the floor is not considered to be a docking operation and will not be treated as such in this description. The remaining links 4, 6, 9, 10, 13 and 14 and joints 3, 5, 7, 8, 11 and 12 also have their counterpart in FIG. 7.

In FIG. 8 a manipulator 80 is illustrated in two dimensions, with a plurality of joints 5, 7, 11 and a plurality of links 6, 81, 82, 83. The manipulator 80 in the figure illustrates the manipulator 2 in a certain kinematic configuration with Axis 1, 4 and 6 (see FIG. 1) fixed such that the remaining axes move in the depicted one plane. The named quantities represent one possible parameterization that facilitates the identification of compliance based on obtained sensor data. As the reference numbers reveal, the joints 5, 7 and 11 have their direct counterpart in the manipulator 2 of FIG. 1, thus being the joints 5, 7 and 11. Furthermore, the link 6 has its direct counterpart being the link 6 of the manipulator 2 of FIG. 1. The remaining links 81, 82 and 83 are in this configuration a combination of links and joints. Thus, link 81 here represents joint 3 and link 4, link 82 represents joint 8 and link 10, and link 83 represents joint 12 and links 9, 13 and 14 of the manipulator 2 of FIG. 1 and FIG. 7. The quantities illustrated in the FIG. 8 pertain to the different joints and links. Thus, $x_k$ denotes the displacement along the x-axis of the associated joint, $y_k$ denotes the displacement along the y-axis of the associated joint, $\theta_k$ denotes the rotational displacement before the joint, $\phi_k$ denotes the rotational displacement after the joint, and $q_k$ denotes the joint angle of the next link in the chain. As mentioned, the joint angles are used in the transformation to global coordinates.

Method

Figure 9:
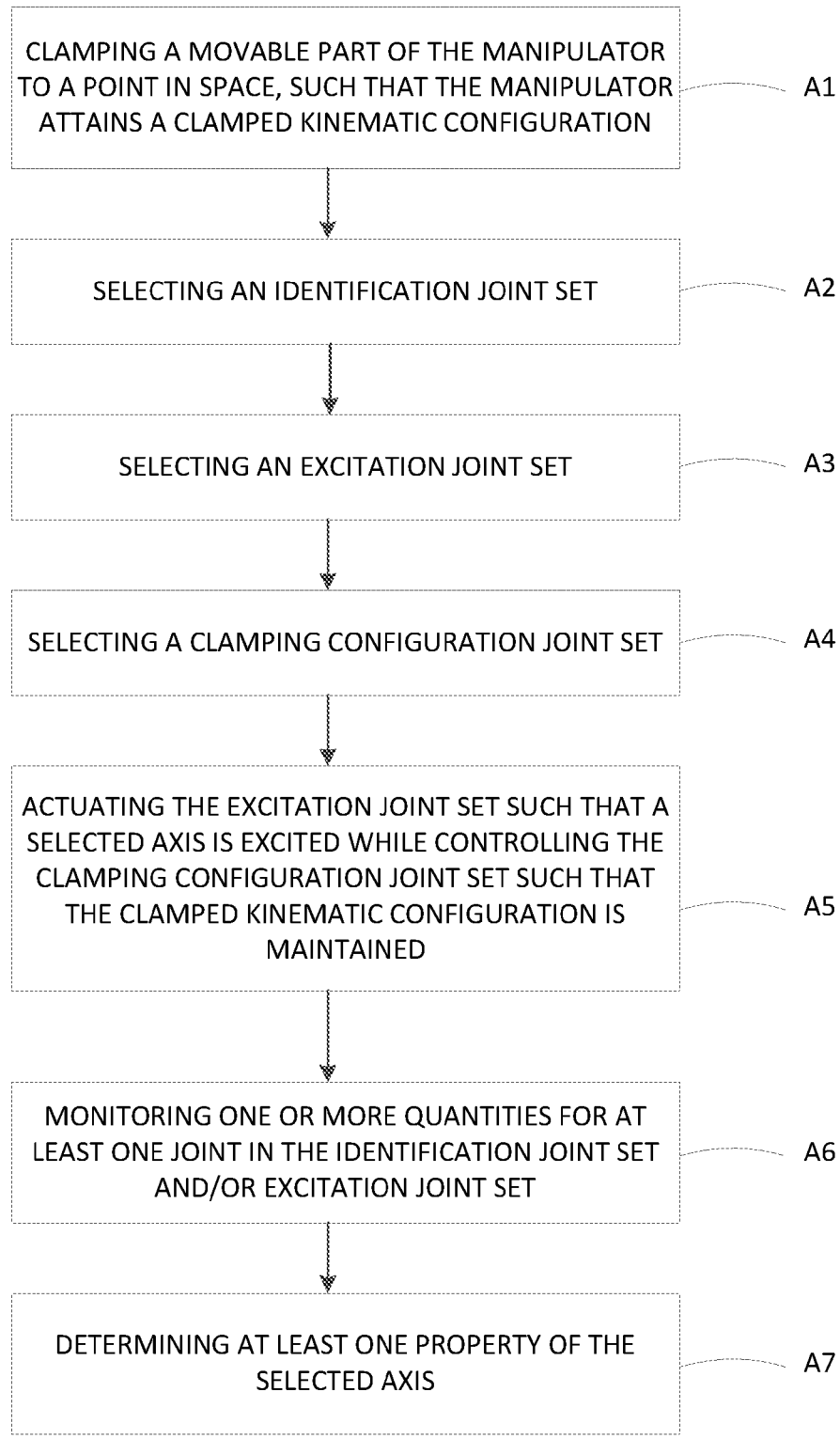
FIG. 9 shows a flow chart of one embodiment of the method according to the present invention.

In FIG. 9 a flowchart shows steps of the method for determining at least one property associated with a selected axis of a manipulator 2. As previously mentioned, an axis is defined to be a joint including a motor and a drive train for actuation and a thereto connected linkage. The linkage may comprise one or several links. The manipulator 2 is in the method controlled by the controller 19 to manually or automatically perform the different steps of the method. The method may be stored as robot or computer instructions in a computer program P in the computer readable storage medium 21 and executed by the control unit 20. Reference will now be made to the flowchart when explaining the method. The flowchart should not be interpreted as a series of steps made in a specific order; the illustrated steps may be made in other orders than illustrated.

According to the method, a movable part of the manipulator 2 is clamped to a point in space by controlling the manipulator 2 such that the manipulator 2 attains a clamped kinematic configuration (A1). As has previously been mentioned, a point in space may be provided by a docking item 18 (FIG. 1). The manipulator 2 may be programmed to change its end-effector by using the tool exchanger to connect to a tool in a tool stand. A manipulator 2 that is not equipped with a tool exchanger during its normal operation can be manually equipped with the same or any other clamping equipment to perform the method, and hence any robot manipulator 2 can be calibrated. A clamped kinematic configuration has previously been defined as a configuration of the manipulator where the manipulator is docked in a predetermined pose that fixes at least one DOF of the end-effector (or whatever movable part of the manipulator 2 that is to be clamped). Since it is practical to clamp all six end-effector DOF (or end-flange or tool-exchanger DOF), that is assumed in the following. While the manipulator 2 is clamped to the point in space, the controller 19 is configured to read out output values from the internal sensors of the joints of the manipulator 2. These values may be drive train parameters which may be translated into joint parameters, such as backlash, compliance and other possible parameters. This is explained more in detail in WO2014065744A1 on pages 13-22 in connection with the FIGS. 2-7 in that application.

The method further comprises selecting an identification joint set comprising at least one joint of the manipulator 2, wherein the at least one joint of the identification joint set is configured to control and monitor the selected axis whose associated at least one property is to be determined (A2). The identification joint set is a set of joints, minimum and typically one, that during normal operation of the manipulator actuate the corresponding set of links with properties to be determined. For identification of the link bending in the plane of the joint motion (FIG. 5) for each axis of this set, the motor control is such that a certain joint torque (compensated for non-linear joint drive-train effects) is applied, and the (again compensated for non-linear joint drive-train effects) position and torque of that joint are measured. For identification of the other (orthogonal with respect to the motion of the preceding joint motion) link properties, the control of a joint in this set is irrelevant. The joint or joints in this set may thus be left unchanged or uncontrolled, and may be only monitored such that certain assumptions are fulfilled.

Further, the method comprises selecting an excitation joint set comprising at least one joint of the manipulator 2 which for the clamped kinematic configuration of the manipulator 2 is configured to excite at least one link connected to the at least one joint of the identification joint set (A3). The method is also selecting a clamping configuration joint set of the manipulator 2 (A4). The clamping configuration joint set typically includes joints that are neither in the excitation joint set nor in the Identification joint set. These joints are controlled such that the kinematic configuration is reached such that these joints substantially do not influence the identification of axis properties, and such that the clamped pose is achieved and maintained. For the latter, adjustment of the docking pose provided by clamping equipment is typically needed, but the (typically PKM) joints of the clamping device do not (by definition) belong to any configured joint set. The at least one joint of the clamping configuration joint set is according to one embodiment not part of the identification joint set and the excitation joint set.

The different joint sets explained above may be predefined, may be calculated by the controller 19 given a number of conditions, or may be randomly chosen until involved matrices have sufficiently high rank.

Hereafter, the method continues by actuating the excitation joint set, such that the selected axis is excited while controlling the clamping configuration joint set such that the clamped kinematic configuration is maintained (A5). The clamping configuration joint set is according to one embodiment controlled such that the clamping configuration joint set substantially does not influence the determination of the at least one property associated with the selected axis.

The actuator torque or torques used to actuate the excitation joint set may be 10-15% of the maximum torque of the actuator(s). While actuating the excitation joint set, the one or more quantities are monitored related to actuator torque and/or joint position for at least one joint in the identification joint set and/or excitation joint set (A6). Based on the monitored one or more quantities, the at least one property of the selected axis is determined (A7). The at least one property of the selected axis may be based on a combination of the monitored one or more quantities related to actuator torque and/or joint position for determining at least on property each for a plurality of selected axes of the manipulator 2.

The steps A1-A6 are advantageously repeated for a plurality of different clamped kinematic configurations, to be able to compute all properties of interest. For example may at least one property each for a plurality of selected axes be determined of the manipulator 2. Thus, the steps A1-A6 are repeated wherein the attained clamped kinematic configuration of the manipulator 2 is different from an, in the method, previously attained clamped kinematic configuration of the manipulator 2, and the at least one property of the selected axis is determined based on the determined properties of the selected axis in the different clamped kinematic configurations.

The step A7 may comprise using a matrix stiffness method. A matrix stiffness method makes use of the links and joints stiffness relations for deriving the displacement of the links and joints of the manipulator 2. As has been illustrated in FIGS. 5-6e, the manipulator 2 can be modeled as a set of idealized links interconnected at the different joints of the manipulator 2. The stiffness properties of these elements can then, by using matrix mathematics, be compiled into a single matrix equation which rules the behavior of the entire idealized structure. In the following a matrix stiffness method will be described with reference to an example of a simple manipulator 100 illustrated in FIG. 10. The manipulator 100 comprises two links, link A and link B, connected by joint AB. In the figure, one end of link A is connected to the joint AB, and the other end of the link A is rigidly connected to a base. Correspondingly, one end of the link B is connected to the joint AB, and the other end of link B is illustrated as being rigidly connected to another base. This corresponds to clamping the manipulator 100 in a certain clamped kinematic configuration. The links A and B have their main extension along an x-axis, and an y-axis is defined to be perpendicular to the x-axis. The end of the link A connected to the base forms a first node, the joint AB forms a second node, and the end of the link B connected to the second base forms a third node. In the figure, displacements of the nodes is illustrated as $x_k$ being the displacement along the x-axis, $y_k$ being the displacement along the y-axis, $\theta_k$ being the displacement around the rotational axis (z-axis) of the joint AB before the joint AB, and $\phi_k$ being the displacement around the z-axis after the joint AB. The displacement of the first node is illustrated to be $x_0$, $y_0$ and $\phi_0$, thus, a starting displacement of the first node that is zero as the first node is rigidly attached to the base. The displacement of the second node is illustrated to be $x_1$, $y_1$, $\phi_1$ and $\theta_1$, and the displacement of the third node is illustrated to be $x_2$, $y_2$ and $\theta_2$. As the first and third node cannot be displaced, $x_2=0$, $y_2=0$ and $\theta_2=0$. Reference is here also made to FIG. 8, illustrating corresponding displacements of the more complex manipulator 80.

Let ˆ denote that the component coordinates are given in a local coordinate system of the component. In general we can model the elastic behavior of any component with the DOF $\hat{u}$ with a function $\hat{F}=\hat{F}(\hat{u})$ which gives the forces at the nodes to achieve the deformations $\hat{u}$. A component may be a joint or a link of the manipulator 2. A common simplification when the deformations $\hat{u}$ are small is to assume linear elasticity and the function $\hat{F}$ can then be expressed as:

$$\hat{F}=\hat{K}\hat{u} \quad (1)$$

where $\hat{K}$ is the component stiffness matrix. This formulation is analog to what is used to represent the elements in FEM. We extend the model to handle active components such as motors where a force or torque is created inside the component. In addition to the already determined component stiffness matrix $\hat{K}$, the forces on the component also consist of a component internal force vector $\hat{T}$, and the forces can then be expressed as:

$$\hat{F}=\hat{K}\hat{u}+\hat{T} \quad (2)$$

There are many different options for representing a link structure and link stiffness matrix. For a planar manipulator, it is feasible to give a link six elastic-DOF, three in each end. A link stiffness matrix for each link should be specified to capture expected deformations on a component level. A link stiffness matrix $\hat{K}_k$ for link k with six elastic-DOF and a linear behavior may be structured as follows, as a variant of (4) below to emphasize the four independent parameters and their relationships:

$$\hat{K}_k = \begin{bmatrix} a_4 & 0 & 0 & -a_4 & 0 & 0 \\ 0 & a_1 & a_2 & 0 & -a_1 & a_2 \\ 0 & a_2 & 2a_3 & 0 & -a_2 & a_3 \\ -a_4 & 0 & 0 & a_4 & 0 & 0 \\ 0 & -a_1 & -a_2 & 0 & a_1 & -a_2 \\ 0 & a_2 & a_3 & 0 & -a_2 & 2a_3 \end{bmatrix} \quad (3)$$

where the parameters $a_1 \ldots a_4$ denote general unknown stiffness parameters.

The six elastic-DOF of a compliant link are not directly actuated, but indirectly via forces from the involved joints that depending on the stiffness of the link in different directions. To model the link deviation due to the joint forces/torques, it is convenient and standard (in solid mechanics) to use a component stiffness matrix (as a linear mapping, assuming link deflections are small compared to link sizes and motions). For simplicity of the method according to the invention, as well as for the practical usage concerning identification and compensation, some stiffness matrix elements can be set to zero, meaning that they either are zero or that the compliance component is sufficiently well captured by other stiffness elements. A known stiffness (e.g. from a FEM analysis of the link) can be set as a constant stiffness element. In practice, and for simplicity of this description, we assume link bending according to FIG. 6b, meaning that the link stiffness matrix (3) will contain only four parameters distributed symmetrically in the 6×6 matrix, corresponding to the axial, transversal and rotational displacement in each end. An example of a component stiffness matrix where the components have constant cross-section with area A is:

$$\hat{K}_k = \begin{bmatrix} \frac{EA}{L} & 0 & 0 & -\frac{EA}{L} & 0 & 0 \\ 0 & 12\frac{EI}{L^3} & 6L\frac{EI}{L^3} & 0 & -12\frac{EI}{L^3} & 6L\frac{EI}{L^3} \\ 0 & 2L^2\frac{EI}{L^3} & 4L^2\frac{EI}{L^3} & 0 & -6L\frac{EI}{L^3} & 2L^2\frac{EI}{L^3} \\ -\frac{EA}{L} & 0 & 0 & \frac{EA}{L} & 0 & 0 \\ 0 & -12\frac{EI}{L^3} & -6L\frac{EI}{L^3} & 0 & 12\frac{EI}{L^3} & -6L\frac{EI}{L^3} \\ 0 & 6L\frac{EI}{L^3} & 2L^2\frac{EI}{L^3} & 0 & -6L\frac{EI}{L^3} & 4L^2\frac{EI}{L^3} \end{bmatrix} \quad (4)$$

where L denotes the length of the link, E denotes the modulus of elasticity in tension as known from Hooke's law, and I denotes the moment of inertia of the cross section.

The joints can be represented in many different ways as well. A component stiffness matrix $\hat{K}_j$ may be structured as follows:

$$\hat{K}_j = \begin{bmatrix} c_j & -c_j \\ -c_j & c_j \end{bmatrix} \quad (5)$$

where $c_j$ denotes the stiffness of the rotation axis of the joint j. The joint is here assumed to be rigid in all directions except around the rotation axis. The joint model also includes a motor which will generate a torque $\tau$. The total force on a joint is then given by:

$$\hat{F} = \begin{bmatrix} -\tau \\ \tau \end{bmatrix} + \begin{bmatrix} c & -c \\ -c & c \end{bmatrix} \begin{bmatrix} \theta \\ \varphi \end{bmatrix} \quad (6)$$

where $\theta$ is rotational displacement before the joint, and $\phi$ is rotational displacement after the joint.

A global stiffness matrix (MSM) may now be assembled using the component stiffness matrices for each link and joint. Since the link stiffness matrix is given in a local coordinate system where the link stiffness matrix is constant, the matrices have to be transformed into a global coordinate system in order to assemble a global stiffness matrix. Such transformation depends on the configuration which is defined by the joint coordinates having manipulator-DOF elements. The transformation will rearrange the stiffness parameter positions in the component stiffness matrix; however the stiffness parameters are still the same. The stiffness of the manipulator therefore varies with the configuration corresponding to the coordinate transformation. Here, the difference between the actuator/motor and the link position due to drive-train effects is normally not critical since it is usually small compared to the joint angles, but in principle it is the joint angles that are relevant (and computable according to WO2014065744A1).

For each single clamped kinematic configuration the link stiffness matrices can be put together, forming the larger MSM. For each clamped kinematic configuration some MSM elements will be zero and other will reflect the constant link stiffness elements. For another configuration, other parts of the MSM will be non-zero and possible to identify by the measurements made in the clamped kinematic configuration. The MSM content can thus be used to select a series of configurations such that all link parameters of interest can be determined, e.g. by non-linear optimization. Thus, the structure of the MSM is defined. The manipulator 2 may be provided with a sensor configured to generate a sensor signal with sensor data when in one or several clamped kinematic configurations to obtain sensor data to be used in the following optimization. The sensor may be a force sensor configured to generate a sensor signal with force data.

Figure 11A:
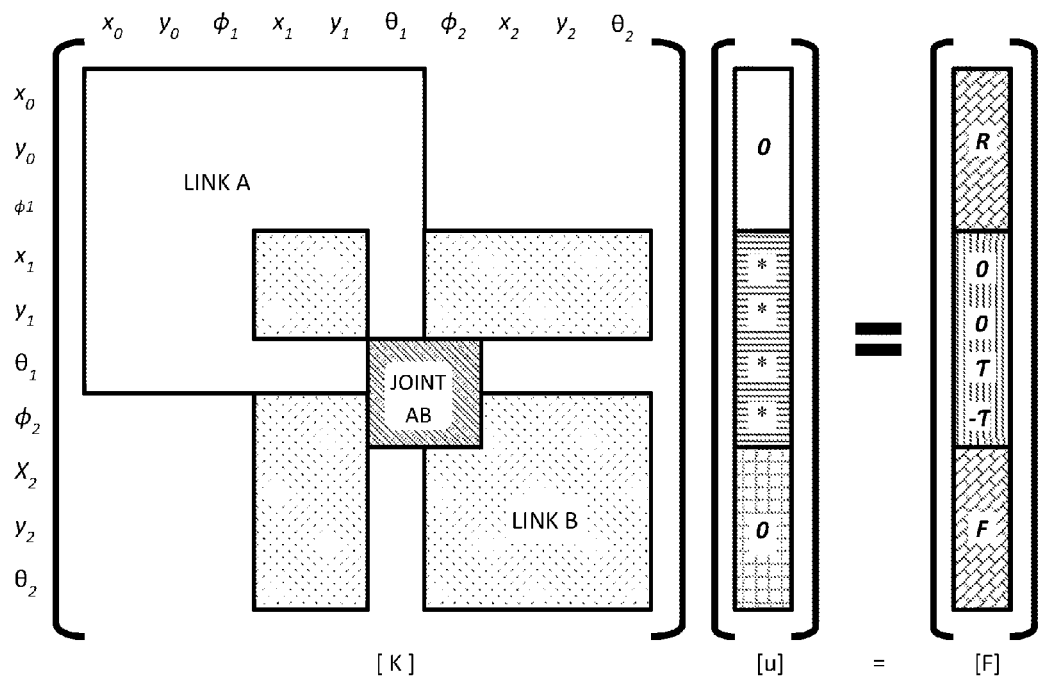
FIG. 11a illustrates an example of an assemblage of a global stiffness matrix for the example in FIG. 10.
Figure 11B:
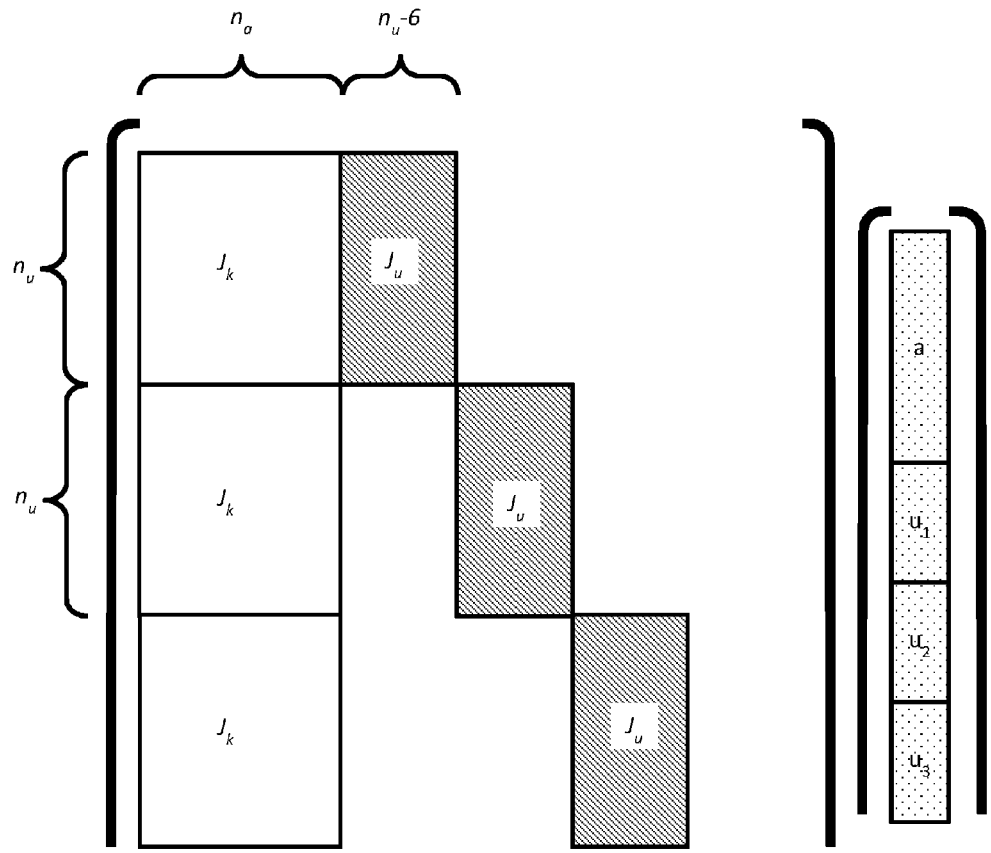
FIG. 11b illustrates an example of assemblage of a global total Jacobian matrix for the example illustrated in FIG. 10.
Figure 12A:
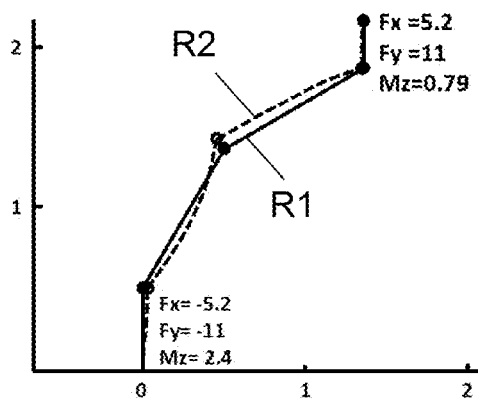
FIGS. 12a-12d illustrate a manipulator with two joints and three links in different clamped kinematic configurations and the resulting compliance when the manipulator is actuated according to the method.
Figure 12B:
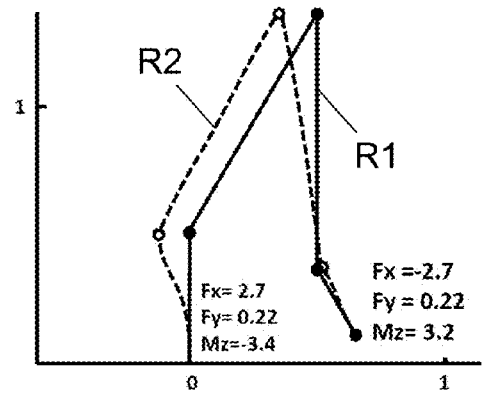
Figure 12C:
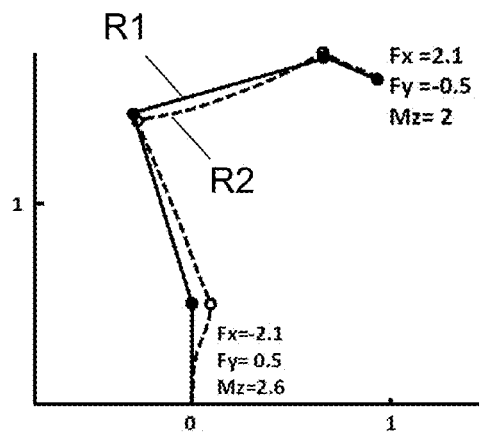
Figure 12D:
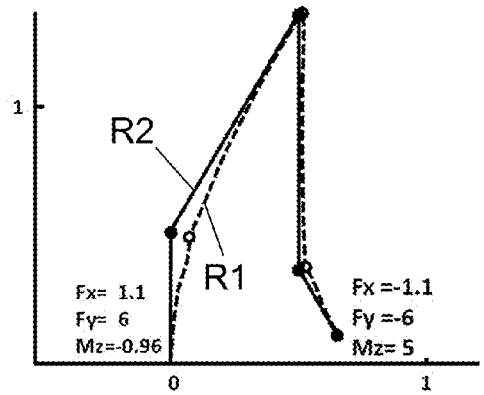

In the following an assemblage of an MSM will be described with reference to the FIGS. 11a-11b. With the displacement coordinates enumerated as shown to the left and on top of the matrix K in FIG. 11a, the MSM for an SKM gets an illustrative structure with link blocks along and around the diagonal of the matrix, and with the joint blocks on the diagonal overlapping the links it connects. For a PKM, or any manipulator including any parallel linkage, there will be MSM elements formed by more than two overlapping component matrices since there are more than two components connected to the same joint. For instance, if a Link C would be connected to the Joint AB (contributing to displacements $x_1$ and $y_1$), it would imply more elements overlapping with a 2×2 block matrix that in FIG. 11a is the overlap of Link A and Link B (for the global displacement coordinates $x_1$ and $y_1$). A parallel joint or a redundant manipulator may also have overlaps of the joint elements. Since the MSM is based on all global displacements, and any combination of linkages can be superimposed onto the spanned structure according to the force/torque balances at the displacement locations, it follows that any manipulator or mechanism can be represented. Hence, the determination of the unknown parameters is facilitated for any type of robot.

It is known from Newton's laws that in a static case, the sum of all forces is equal to zero. This is thus true for the nodes in our model, as well as anywhere else. We know that the forces from component k is $\hat{F}_k$, where $\hat{F}_k$ depends of the defined structure of the component as previously described. We want to sum all forces of the same direction in each point. In order to do so, the local DOF of each link need to be transformed to a global coordinate system of the manipulator 2. The transformation may be described by the equations (7) and (8) below. If the component in FIG. 10 initially was described in a coordinate system along the links A and B, we need to find a map from the local DOF $x_k$, $y_k$, $\phi_k$ and $\theta_k$ to a global coordinate system. We observe the relation to be:

$$x_k = \cos(\theta)u_x - \sin(\theta)u_y \quad (7)$$

$$y_k = \sin(\theta)u_x + \cos(\theta)u_y \quad (8)$$

where $x_k$ and $y_k$ are displacements in the global coordinate system, $u_x$ extends along the main axis of the link, $u_y$ extends along the height of the link. The rotations $\phi_k$ and $\theta_k$ are not affected by the coordinate change in the planar case, but for a general three dimensional system, there will be a map between the rotational coordinates as well. From the relations in equations (7) and (8) we can form the coordinate transformation matrix L according to:

$$L = \begin{bmatrix} \cos(\theta) & -\sin(\theta) & 0 & & & \\ \sin(\theta) & \cos(\theta) & 0 & & 0 & \\ 0 & 0 & 1 & & & \\ & & & \cos(\theta) & -\sin(\theta) & 0 \\ & 0 & & \sin(\theta) & \cos(\theta) & 0 \\ & & & 0 & 0 & 1 \end{bmatrix} \quad (9)$$

The coordinate transformation matrix transforms a component stiffness matrix in the local coordinate system to a global coordinate component stiffness matrix. In a 3-dimensional case where the links may have any orientation, the transformation matrix will be more complex but can be specified from a quaternion describing the link orientation. The global coordinate component stiffness matrix $K_k$ for component k is then given by:

$$K_k = L\hat{K}_k L^T \quad (10)$$

The forces from component k on the nodes connected to component k is now given by:

$$\hat{F}_k = \hat{K}_k \hat{u}_k \quad (11)$$

We now sum all the forces acting on each direction in each node. This is done by adding the component stiffness matrices $K_k$ expressed in the global coordinates to the corresponding locations in K. This is in analogy with how a stiffness matrix is assembled in a FEM. Furthermore we have some boundary conditions at the manipulator base and clamped end-effector, here the displacements are zero. The assemblage process is illustrated with FIG. 11a. As indicated in FIG. 11a, there are rectangular blocks of the MSM matrix K that are zero, i.e. not part of any marked sub-matrices. The illustrative block structure of the K matrix of course depends on how the displacements are enumerated. The enumeration used in this example is written on top and to the left of the K matrix in FIG. 11a. Overlapping matrix blocks mean that there is a summation of the influences from the components that overlap, including the trigonometry that is necessary to transform local displacement into global displacement according to the row of the K matrix, such that the force/torque balance holds at the point of that global coordinate. In this example, the elements of Link A that overlaps with the elements of Link B, here forming the 2×2 block matrix for global displacement coordinates $x_1$ and $y_1$. In a similar way, the Joint AB overlaps with the links it is connected to. Since this is not a passive joint, the joint torque r from the actuation (by motor via the drive-train, not shown in FIG. 10) will result in non-zero elements on those rows of the vector F. Additionally, for each clamped configuration some of the MSM link-matrix elements will be zero while the other MSM elements will have values representing the link and joint stiffnesses. In contrast to equation (1) that includes a component stiffness matrix in coordinates local to the link, the system depicted in FIG. 11a, following from equation (12) and equation (13), is referring to a global coordinate system, and hence a constant link stiffness matrix appears in the MSM via corresponding transformations, which for each element include trigonometric functions. These functions may appear implicitly by quaternion elements representing the link orientation corresponding to the joint angles q (see FIG. 8).

The modeling above has provided us with an equation system on the form Ku=F. Let $n_a$ be the number of elastic-DOF of the compliant manipulator, which is equivalent to the number of rows and columns in K, and same as the number of rows in u or F. The matrix K consists of the $n_a$, unknown stiffness parameters $a_1 \ldots a_{n_a}$ and the vector u consists of $n_u-6$ unknown deformations $u_4 \ldots u_{n_u-3}$ and six deformations known to be zero. The vector F is completely known. We define the function S as:

$$S = S(X) = Ku \qquad (12)$$

and $X = a_1, \ldots a_{n_a}, u_4, \ldots u_{n_u-3}$ are all unknown parameters. Hence, the DOF for the elastic part of the system is in total $n_u$. The goal is to minimize the residual norm:

$$r = \|S - F\| \qquad (13)$$

which can be done by using a conventional Newton iterative solver. Thus, an optimization is performed based on the one or more monitored quantities. Specifically, the function S is linearized to:

$$S = S_0 + [J_k J_u] \delta X \qquad (14)$$

where $S_0 = S(X_0)$ and $X_0$ is an initial estimation of the unknown parameters, $J_k$ is the Jacobian matrix of $S(X)$ with respect to the stiffness parameters $a_k$ and $J_u$ is the Jacobian matrix with respect to the deformations $u_k$ for the same initial guess of $X = X_0$. The vector X is solved for by iterating with increments of $\delta X$ obtained by solving the equation:

$$S_0 + [J_k J_u] \delta X = F \qquad (15)$$

The Jacobian matrix has $n_u$ rows and $n_a$, $+n_u-3$ columns, and will always be singular when $n_a > 6$. To overcome the singularities, the manipulator is positioned in more configurations. For each new configuration we get $n_u$ new equations, but also $n_u-6$ new unknowns. The stiffness parameters are the same in all configurations while the deformations are different. The vector X will therefore grow with $n_u-6$ additional deformations. The columns of the Jacobian matrix will grow with the same number. The global stiffness matrix can then be solved and the stiffness parameters $a_1 \ldots a_{n_a}$, and the deformations $u_4 \ldots u_{n_u-3}$ are determined. Thus, the manipulator stiffness parameters, i.e. the properties to be determined by the method, are organized according to the structure of the MSM that relates possibly unknown displacements of links and joints to torques and forces such that any combination of serial and parallel linkages can be represented. Thus, together with the following solution strategy, the determination of the unknown properties is facilitated by the presented MSM structure.

A minimum possible number of configurations to get a non-singular Jacobian is:

$$n_{CONF} = \frac{n_a}{6} \qquad (16)$$

Equation (14) only tells that the Jacobian is guaranteed to be singular if the number of equations are less than $n_{CONF}$, however linear dependency between the columns may still occur and it could be useful to add more configurations. The two Jacobian matrices are calculated for each configuration and assembled into a global total Jacobian matrix as illustrated in FIG. 11b.

Figure 10:
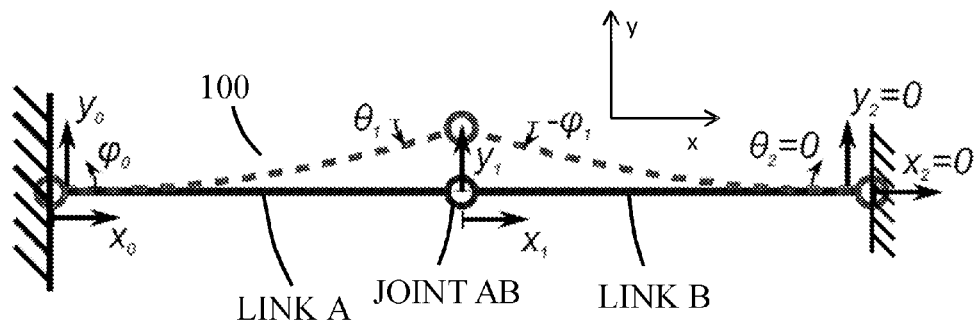
FIG. 10 illustrates an example of link and joint deformation.

The method has here been illustrated in connection with the simplified example of FIG. 10, but it is understood that the method can be applied to any manipulator, e.g. the manipulator 2 in FIG. 1.

The manipulator 2 is exerted to effect of gravity, and the mass of the manipulator 2 will thus influence the shape of the links and cause deflection of manipulator components. This means that the gravity adds on the link bending. The gravity influence can be divided into link gravity influence and joint gravity influence. According to one embodiment, the method comprises determining a gravitational effect value acting on the selected axis, and compensating the determined at least one property of the selected axis for the determined gravitational effect value. The explained link stiffness matrix (3) in principle models this bending caused by gravitation, but the difference is that while the link stiffness matrix (3) captures the bending due to forces F and torques M, the gravity force influences at another unknown location on the link. One reasonable model for the purpose of the compensation of major dynamic effects is to assume that the link mass being a point mass in the mass center of the link as has been illustrated in FIG. 6c, and that the link has an even distribution of the bending between the adjacent joints as has been illustrated in FIG. 6d. On one hand this appears as being a contradiction since a distributed and even bending suggests a distributed mass, which is opposite to the point mass of the suggested simplified link gravity influence model. On the other hand, such a simplification is consistent and has several advantages:

The complete Jacobian after all necessary experiments will be part of an over-determined equation, or set of equations, to be solved by pseudo inverses or non-linear optimization, and then the inaccuracies will be suppressed.

The assumptions are coherent with how most robots today are constructed.

A more detailed model would require FEM analysis (or similar non-rigid body modeling) of the link which can be done but requiring engineering that the method of this invention in practice avoids.

The stiffness parameters $a_1$-$a_{n_a}$ for the link stiffness matrix (3) can be used to capture also for the link gravity effect, which as illustrated in FIG. 6d can be managed in the frame of the method of the invention.

There is (after the separate free-space experiments determining the joint gravity effects) a clear and automatic way of including the link gravity effects in the identification of link properties. Even if these effects are not exactly the true ones, they are the suitable simplifications for compensations that utilize the link properties.

The quasi-static assumption for elasto-dynamic models implies that the link inertia around its center of mass is negligible.

According to one embodiment, the method comprises comparing the at least one property with a previous obtained property value or predefined property value, determining a difference value between the at least one property and the previous obtained property value or predefined property value, comparing the difference value with a difference threshold value and determining wear of the manipulator based of the result of the comparison. Thus, wear of the manipulator may be determined by analyzing if the determined property differs from any previous obtained property values, or predefined property value representing a property of the selected axis with, e.g. essentially no wear, or allowable wear. For example, the values of the property may be determined at different points of time and compared. If a difference between the values is greater than the difference threshold value, then it can be determined that the selected axis is worn and maybe parts of it need to be replaced.

According to one embodiment, the manipulator is a parallel kinematic manipulator.

According to another embodiment, the manipulator is a multiple-arm manipulator, or multiple robots with some shared work-space. The method may then be performed by attaining a clamped kinematic configuration by clamping one manipulator arm of the manipulator (or any selected movable part of it) to any other manipulator arm of the manipulator (or any selected movable part of it).

According to one embodiment, the method comprises obtaining specific kinematic parameters by means of kinematic calibration of a manipulator 2 and updating kinematic parameters based on the at least one determined property of the selected axis.

The determined at least one property of the manipulator 2 can be made use of for a plurality of applications and ways. For example, the at least one property can be used for updating nominal kinematic parameters of the manipulator 2. The at least one property can be used for kinematic calibration of the manipulator. According to another embodiment, the at least one property is used for updating robot programs or motion control parameters of the manipulator 2.

The invention also relates to a computer program P associated with the system 1, wherein the computer program P comprises computer instructions configured to cause a control unit 19 to perform the method according to any of the previously illustrated steps. The invention further concerns a computer program product comprising computer instructions stored on a computer readable storage medium 21 to perform the method according to any of the previously illustrated steps. The invention furthermore concerns a computer program product comprising the at least one property obtained when performing the method according to any of the previously illustrated steps, wherein the at least one property is stored on a computer readable storage medium 21.

The illustrated method may be performed for a plurality of robots of the same series in order to obtain nominal mean values for the link and joint properties which using statistics may be used to determine a statistical distribution of these properties across the robot series. This data may then be used to compensate for link and joint compliances in a robot of the same type.

The above explained method provides a more accurate way of determining compliance of a robot than previous known solutions. Costs may be reduced as there is e.g. no need for calibration systems or to dismount the robot or lock certain parts in order to perform the method, which also make the method easier to perform than previous known solutions.

EXAMPLE

An example will now be explained with reference to FIGS. 12*a*-12*d*, illustrating the manipulator 80 (FIG. 8) used in the example in the undeformed (R1) and deformed states (R2) in a plurality of clamped kinematic configurations. The deformations are scaled in the figures for easier observations. The manipulator 80 comprises three joints and four links. Each link has four stiffness parameters and each joint has one stiffness parameter. Motor torques are applied at the joints which gives a deformation of the manipulator. The joint values where the manipulator was simulated as clamped was randomly selected as a number between −2 and 2 radians, and the motor torques were chosen randomly as a number between −1 Nm and +1 Nm and we used 16 configurations to form the equations, four of them being shown in FIG. 12.

The manipulator 80 is a planar view of the manipulator 2 in a certain kinematic configuration. That is, joints 1, 4, and 6 of the manipulator 2 forms the clamping configuration joint set. In this example with random excitation, all the other joints belong to both the identification joint set and to the excitation joint set. This approach is useful if no high-level knowledge about the robot structure in known, but a skilled operator could select configurations (typically with more right angles) with the joints split into different sets, which would require fewer configurations to determine all properties.

Individual stiffness parameters of the manipulator were obtained using motor torque values and force values as if a force/torque sensor was used at the end effector (then also giving the base forces assuming gravity and motor torques being known). Thus, the forces at any of the endpoints of the manipulator are known (i.e., F and R in FIG. 11*a* are known). The manipulator end-effector is clamped to a set of fixed position when performing the method, but no additional clamping between joints or links, nor dismounting of any components, are necessary. This example and the numerical solutions are for the described serial manipulator but the same principles can be applied to parallel kinematic manipulators. The elasticities are modeled with stiffness matrices for each component, which are assembled into a global stiffness matrix for all components of the manipulator system in a similar way as the elements in FEM are assembled. As stated earlier, link compliance may be characterized as bending, elongation and twisting of the link due to the movement of joints affecting the link, but also due to link and joint gravity forces. A conventional kinematic model of the manipulator is used to determine the new position and orientation of the components in the stiffness model due to compliance etc. The deformations are then assumed to be small and we can then approximate the elastic behavior with a linear model in the undeformed state. Then the output from the kinematic model is the necessary information to transform each component stiffness matrix (3) to a global coordinate system together with the mapping description between the local component DOF to the global DOF. In case of a future overly compliant manipulator for which the assumption about small deformations does not hold, the global stiffness matrix would depend on the component positions and orientations (i.e. the robot joints) as well as the component deformations.

This example shall be seen as just an illustrative example of the method of the invention, as should not be seen as limiting for the invention, which is straightforward to extend to other kinematic structures, to three dimensions, and/or to manipulators with more DOF.

Practices

Figure 13A:
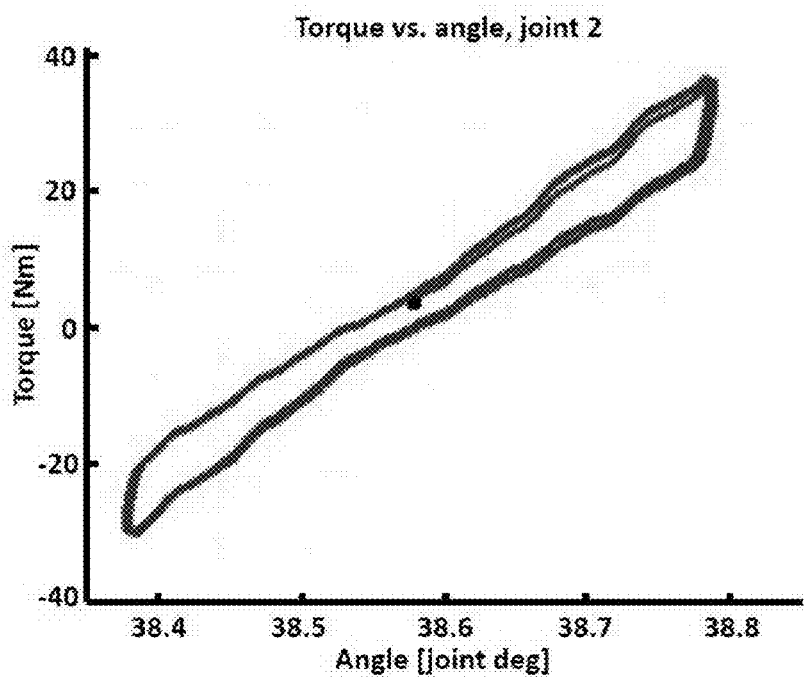
FIGS. 13a-13b illustrate several load cycles of Axis 2 and Axis 3 of another robot.
Figure 13B:
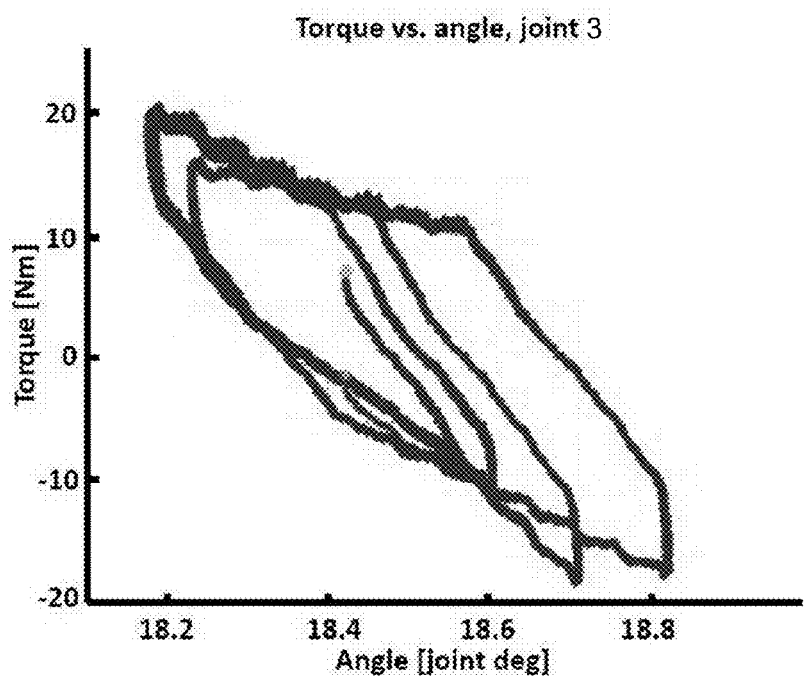

According to a further embodiment, the method comprises determining one or several properties not fulfilling the assumptions of the described models, or existence of such properties. With model assumptions fulfilled and with sufficient numerical conditions, the residual norm r that is computed from equations (12), (13) and (14) as mentioned above will be practically zero. By proper scaling of the quantities, the numerical condition is improved and the equations are solved in just a few iterations. However, if the solver does not converge to a small residual, the manipulator has some unmodeled property, such as broken bearings in a joint or some other mechanical deficiency following from unfortunate design or production of some linkage. As an example, FIGS. 13*a* and 13*b* show data from the use of the method described in WO2014065744A1 for determining drive train parameters of a manipulator, in this case for a six DOF manipulator with a maximum payload of 185 kg but loaded about 15% of maximum torque of Axis 2 and Axis 3 during clamped configuration. This robot (not shown) has axes similar to those shown in FIG. 1 but without the parallel part 23 of Axis 3.

FIG. 13a shows the measured quantities position and torque for Axis 2. The motion starts at the center, then moving several cycles with practically repeatable behavior. The vertical difference between the curves is the joint friction times two, and the slope is the joint stiffness. The slight variation of these two parameters is apparently repeatable, and hence can be compensated for within the joint control such that the assumptions of the joint and link models are very well fulfilled.

FIG. 13b corresponds to FIG. 13a with several load cycles, but instead for Axis 3, which exhibits a non-ideal behavior. Mainly, the slopes (of lines crossing the zero torque level) corresponding to joint stiffness which depends on loading direction, and the vertical gap exhibiting the joint friction times two is not consistent with any well-defined parameter value. Involving this joint in the Excitation or Identification joint sets, with values from more than one cycle, will result in a too large residual and the largest elements of the residual can be used to determine what joint is misbehaving.

For the applied cyclic loads, the position versus torque graphs of FIGS. 13a and 13b should be the same for each cycle. Instead, while the loading curve in FIG. 13a shows the expected repetitiveness, the curve in FIG. 13b is different for different cycles. That is due to a mechanical deficiency of the elbow of that robot, and in such a case the residual r remains larger than expected if measured quantities are obtained from such multiple cycles. The non-zero elements of r then contains information of what part of the manipulator that is problematic, although there will be no numerical value representing a certain property since it is outside the scope of the models that represents well-behaving robot arms. Thus, such a situation can be detected by the current method.

By separating the joints such that non-ideal axes, which were only Axis 3 for the mentioned robot, have their joints in the Clamped configuration joint set with constant load during the determination of properties of all other links, the residual for that optimization (not determining Axis 3 parameters) will be very close to zero. A second set of experiments with only Axis 3 being investigated will confirm the inconsistency. The skilled person can observe the problem by studying FIG. 13b, but the numerical check of the residual as of the current invention is more suitable for robots analyzing themselves.

The present invention is not limited to the above-described preferred embodiments. Various alternatives, modifications and equivalents may be used. For instance, clamping is preferably done by restricting one or several DOF in both directions of the respective motion, but by splitting it into two parts for each DOF, dual experiments covering one side each can in principle be performed and then fitted together. The implication is that robots getting in contact with any object that is rigid or has a known compliance will be able to determine some joint and/or link property. Therefore, the above embodiments should not be taken as limiting the scope of the invention, which is defined by the appending claims.

The invention claimed is:

1. A method for determining at least one compliance property associated with a selected axis of a manipulator (2), wherein said manipulator (2) is configured to be controlled by a controller (19), and comprises at least one axis comprising a joint and a linkage connected to said joint, wherein the joint is configured to be actuated via a drive train by torque from an actuator, the method comprising:
    (a) clamping a movable part of the manipulator (2) to a point in space by controlling the manipulator (2) such that the manipulator (2) attains a clamped kinematic configuration;
    (b) selecting an identification joint set comprising at least one joint of the manipulator (2), wherein the at least one joint of the identification joint set is configured to control and monitor said selected axis whose associated at least one compliance property is to be determined;
    (c) selecting an excitation joint set comprising at least one joint of the manipulator (2) which for the clamped kinematic configuration of the manipulator (2) is configured to excite at least one link of the selected axis connected to the at least one joint of the identification joint set;
    (d) selecting a clamping configuration joint set of the manipulator (2), wherein the at least one joint of the clamping configuration joint set is not part of the identification joint set and the excitation joint set;
    (e) actuating said excitation joint set, such that said selected axis is excited while controlling the clamping configuration joint set such that the clamped kinematic configuration is maintained with the movable part of the manipulator at the point in space;
    (f) monitoring one or more quantities related to joint torque and joint position obtained from actuator torque and actuator position for at least one joint in the identification joint set and/or excitation joint set; and
    (g) determining the at least one compliance property of said selected axis based on the one or more quantities monitored.

2. The method according to claim 1, wherein the at least one compliance property comprises linear compliance for the link and/or joint of said selected axis.

3. The method according to claim 1, wherein the at least one compliance property comprises torsional link compliance.

4. The method according to claim 2, wherein the at least one compliance property comprises link-bending compliance.

5. The method according to claim 1, wherein the at least one compliance property comprises orthogonal joint compliance.

6. The method according to claim 1, further comprising:
    determining at least one compliance property each for a plurality of selected axes of the manipulator (2).

7. The method according to claim 1, further comprising:
    repeating the method wherein the attained clamped kinematic configuration of the manipulator (2) is different from a previously attained clamped kinematic configuration of the manipulator (2); and
    determining at least one compliance property of said selected axis based on the determined compliance properties of said selected axis in the different clamped kinematic configurations.

8. The method according to claim 1, wherein the step of determining the at least one compliance property comprises determining a manipulator stiffness matrix for the manipulator (2) based on the one or more monitored quantities.

9. The method according to claim 8, further comprising:
    organizing compliance properties according to a structure of the manipulator stiffness matrix that relates possibly unknown displacements of links and joints to torques and forces such that any combination of serial and parallel linkages can be represented, thereby facilitating the determination of these compliance properties.

10. The method according to claim 1, wherein the step of determining the at least one compliance property comprises performing an optimization based on the one or more monitored quantities.

11. The method according to claim 10, wherein the manipulator (2) is provided with a sensor configured to generate a sensor signal with sensor data when in said clamped kinematic configuration, and wherein the method further comprises:
including sensor data from the manipulator (2) in the optimization.

12. The method according to claim 11, wherein said sensor is a force sensor configured to generate a sensor signal with force data.

13. The method according to claim 1, wherein the clamping configuration joint set is controlled such that the clamping configuration joint set substantially does not influence the determination of the at least one compliance property associated with the selected axis.

14. The method according to claim 1, further comprising:
comparing the at least one compliance property with a previous obtained compliance property value or predefined compliance property value;
determining a difference value between the at least one compliance property and the previous obtained compliance property value or predefined compliance property value; and
comparing the difference value with a difference threshold value and determining wear of the manipulator (2) based of the result of the comparison.

15. The method according to claim 1, wherein the manipulator is a parallel kinematic manipulator.

16. The method according to claim 1, further comprising:
obtaining specific kinematic parameters by means of kinematic calibration of a manipulator (2); and
updating kinematic parameters of the manipulator (2) based on said at least one determined compliance property of said selected axis.

17. The method according to claim 1, wherein said at least one compliance property includes a compliance property used for updating nominal kinematic parameters of a manipulator (2).

18. The method according to claim 1, wherein said at least one compliance property includes a compliance property used for updating robot programs of a manipulator (2).

19. The method according to claim 1, wherein said at least one compliance property includes a compliance property used for motion control parameters of a manipulator (2).

20. A system (1) for determining at least one compliance property associated with a selected axis of a manipulator (2), the system (1) comprising:
a manipulator (2) with at least one axis comprising a joint and a linkage connected to said joint;
at least one actuator configured to actuate the joint via a drive train by means of actuator torque; and
a controller configured to control the manipulator (2), wherein the controller (19) comprises a control unit (20) and a computer readable storage unit (21) comprising instructions configured to:
(a) make the control unit (20) clamp a movable part of the manipulator (2) to a point in space by controlling the manipulator (2) such that the manipulator (2) attains a clamped kinematic configuration;
(b) select an identification joint set comprising at least one joint of the manipulator (2), wherein the at least one joint of the identification joint set is configured to control and monitor said selected axis whose associated at least one compliance property is to be determined;
(c) select an excitation joint set comprising at least one joint of the manipulator (2) which for the clamped kinematic configuration of the manipulator (2) is configured to excite at least one link of the selected axis connected to the at least one joint of the identification joint set;
(d) select a clamping configuration joint set of the manipulator (2), wherein the at least one joint of the clamping configuration joint set is not part of the identification joint set and the excitation joint set;
(e) actuate said excitation joint set, such that said selected axis is excited while controlling the clamping configuration joint set such that the clamped kinematic configuration is maintained with the movable part of the manipulator at the point in space;
(f) monitor one or more quantities related to joint torque and joint position obtained from actuator torque and actuator position for at least one joint in the identification joint set and/or in the excitation joint set;
(g) determine the at least one compliance property of said selected axis based on the one or more quantities monitored; and
(h) generate a compliance property signal indicating said at least one compliance property.

21. A computer program embodied in a non-transitory medium (21) readable by a control unit (19), wherein the computer program comprises instructions executable by the control unit (19) to cause the control unit (19) to perform a method for determining at least one compliance property associated with a selected axis of a manipulator (2), wherein said manipulator (2) is configured to be controlled by the controller (19), and comprises at least one axis comprising a joint and a linkage connected to said joint, wherein the joint is configured to be actuated via a drive train by torque from an actuator, the method comprising:
(a) controlling the manipulator (2) to clamp a movable part of the manipulator to a point in space such that the manipulator (2) attains a clamped kinematic configuration;
(b) selecting an identification joint set comprising at least one joint of the manipulator (2), wherein the at least one joint of the identification joint set is configured to control and monitor said selected axis whose associated at least one compliance property is to be determined;
(c) selecting an excitation joint set comprising at least one joint of the manipulator (2) which for the clamped kinematic configuration of the manipulator (2) is configured to excite at least one link of the selected axis connected to the at least one joint of the identification joint set;
(d) selecting a clamping configuration joint set of the manipulator (2), wherein the at least one joint of the clamping configuration joint set is not part of the identification joint set and the excitation joint set;
(e) actuating said excitation joint set, such that said selected axis is excited while controlling the clamping configuration joint set such that the clamped kinematic configuration is maintained with the movable part of the manipulator at the point in space;
(f) monitoring one or more quantities related to joint torque and joint position obtained from actuator torque and actuator position for at least one joint in the identification joint set and/or excitation joint set; and (g) determining the at least one compliance property of said selected axis based on the one or more quantities monitored.

22. A computer program product comprising computer instructions stored on a non-transitory computer-readable storage medium (21), wherein the instructions are executable by a computer to perform a method for determining at least one compliance property associated with a selected axis of a manipulator (2), wherein said manipulator (2) is configured to be controlled by the controller (19), and comprises at least one axis comprising a joint and a linkage connected to said joint, wherein the joint is configured to be actuated via a drive train by torque from an actuator, the method comprising:

(a) controlling the manipulator (2) to clamp a movable part of the manipulator (2) to a point in space such that the manipulator (2) attains a clamped kinematic configuration;

(b) selecting an identification joint set comprising at least one joint of the manipulator (2), wherein the at least one joint of the identification joint set is configured to control and monitor said selected axis whose associated at least one compliance property is to be determined;

(c) selecting an excitation joint set comprising at least one joint of the manipulator (2) which for the clamped kinematic configuration of the manipulator (2) is configured to excite at least one link of the selected axis connected to the at least one joint of the identification joint set;

(d) selecting a clamping configuration joint set of the manipulator (2), wherein the at least one joint of the clamping configuration joint set is not part of the identification joint set and the excitation joint set;

(e) actuating said excitation joint set, such that said selected axis is excited while controlling the clamping configuration joint set such that the clamped kinematic configuration is maintained with the movable part of the manipulator at the point in space;

(f) monitoring one or more quantities related to joint torque and joint position obtained from actuator torque and actuator position for at least one joint in the identification joint set and/or excitation joint set; and (g) determining the at least one compliance property of said selected axis based on the one or more quantities monitored.

* * * * *